June 29, 1943. G. R. SUTHERLAND 2,323,255
COIN CONTROLLED VENDING MACHINE
Filed July 26, 1940 11 Sheets-Sheet 1

INVENTOR
GEORGE R. SUTHERLAND
BY
ATTORNEY

June 29, 1943.  G. R. SUTHERLAND  2,323,255
COIN CONTROLLED VENDING MACHINE
Filed July 26, 1940  11 Sheets-Sheet 2

INVENTOR
GEORGE R. SUTHERLAND
BY
ATTORNEY

INVENTOR
GEORGE R. SUTHERLAND
BY
ATTORNEY

INVENTOR
GEORGE R. SUTHERLAND
BY
ATTORNEY

June 29, 1943.   G. R. SUTHERLAND   2,323,255
COIN CONTROLLED VENDING MACHINE
Filed July 26, 1940   11 Sheets-Sheet 7
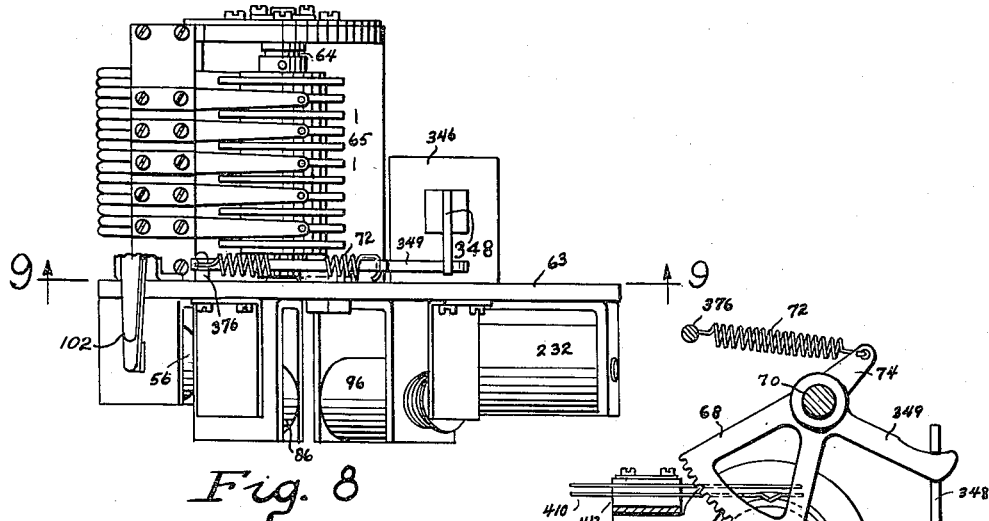
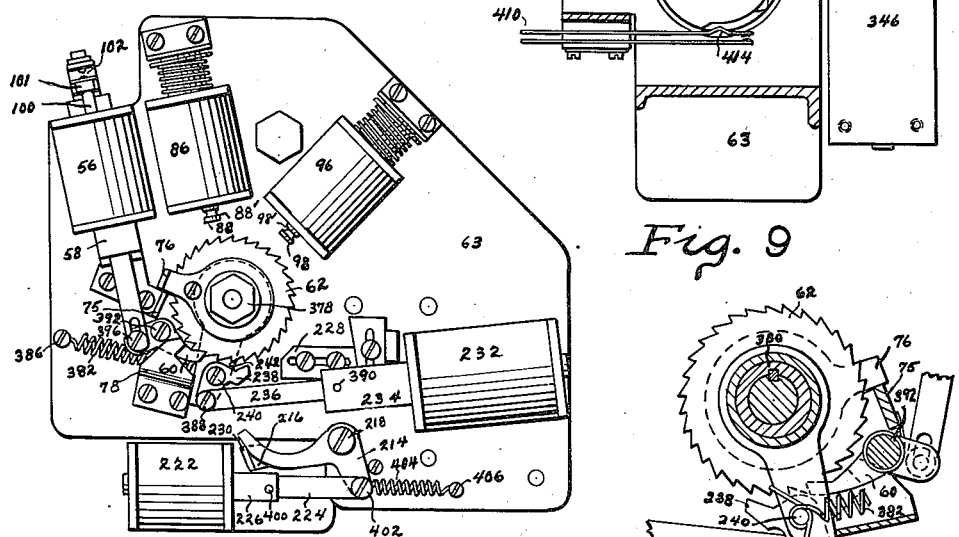
INVENTOR
GEORGE R. SUTHERLAND
ATTORNEY

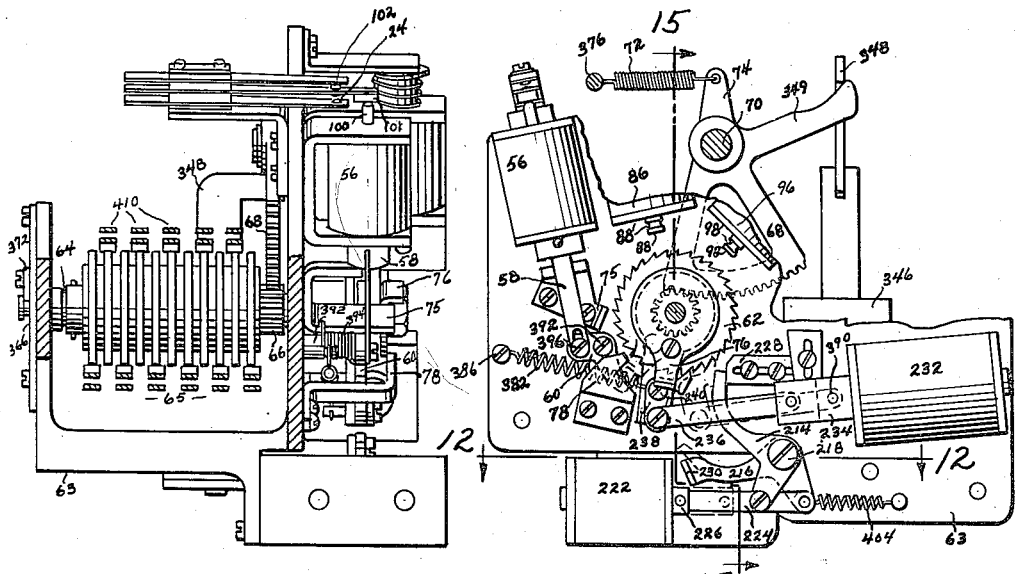

INVENTOR
GEORGE R. SUTHERLAND
BY
ATTORNEY

June 29, 1943.   G. R. SUTHERLAND   2,323,255
COIN CONTROLLED VENDING MACHINE
Filed July 26, 1940   11 Sheets-Sheet 10
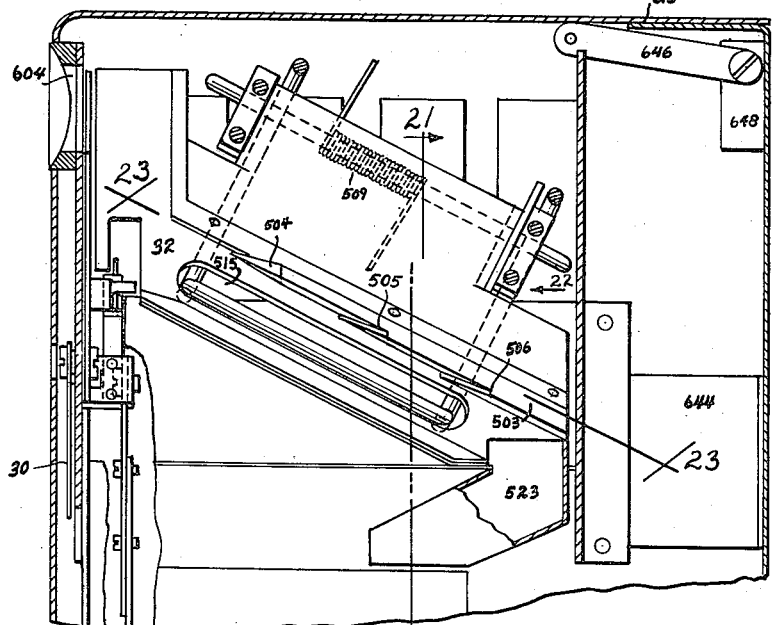
Fig. 20
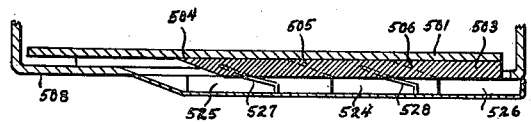
Fig. 23
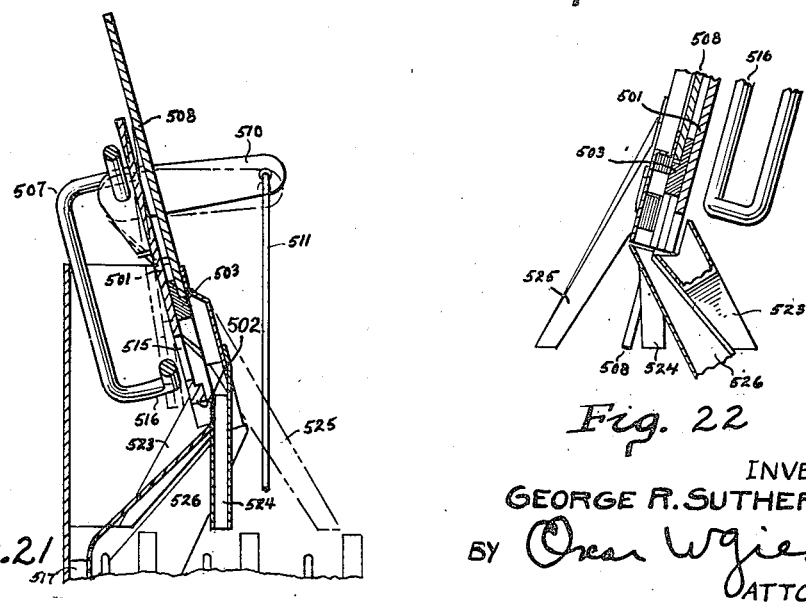
Fig. 21
Fig. 22
INVENTOR
GEORGE R. SUTHERLAND
BY Oscar W. Giese
ATTORNEY Patented June 29, 1943

2,323,255

UNITED STATES PATENT OFFICE 2,323,255

COIN CONTROLLED VENDING MACHINE

George R. Sutherland, Hayfield, Minn.

Application July 26, 1940, Serial No. 347,668

40 Claims. (Cl. 194—10)

This invention relates to a coin controlled vending machine.

An object of the invention is to provide a machine flexibly adapted to receive any coin of a variety of denominations, to permit the user to obtain any articles of a number of types in such quantities as he desires, and to obtain the proper change if the value of the coin inserted exceeds the total value of the articles purchased.

Another object of the invention is to provide a coin receiving mechanism adapted to receive coins of various denominations.

A further object is to provide an adjustable credit mechanism adapted to be set to a credit proportional to the value of the coin inserted in the machine by the user.

A further object of the invention is to provide article dispensing mechanism adapted to deliver articles of different type and in different quantities.

A still further object of the invention is to provide change mechanism for dispensing change to the user at the conclusion of his operation of the machine.

Another object of the invention is to provide means for automatically adjusting the credit mechanism upon the deposit of a coin to a setting proportional to the value of the coin received.

Another object of the invention is to provide means for automatically lowering the setting of the credit mechanism proportionally to the value of the article or articles dispensed.

A further object of the invention is to provide control means for the change making means automatically set by the credit mechanism so that the user can obtain the correct amount of change at any time.

Another object of the invention is to provide means whereby the user can at any time operate the change making mechanism to obtain the correct change to which he is entitled.

A further object of the invention is to provide selector means which can be operated by the user after the deposit of the coin to obtain articles in the desired number of any of a variety of types.

Another object of the invention is to permit the user to obtain a desired number of articles of one type and thereafter to obtain articles of a different type.

One object of the invention is to prevent the user from obtaining articles whose value exceeds the credit of the user in the machine.

A still further object of the invention is to prevent the delivery operation of the article dispensing mechanism in case the supply of articles is exhausted.

Another object of the invention is to close the coin receiving mechanism to a deposit of further coins if the supply of change in the change making mechanism becomes insufficient for further operation of the machine.

A special object of the invention is to provide time controlled means for insuring that the adjusting of the credit mechanism to the setting proportional to the value of the coin inserted will be accurately completed.

Another special object of the invention is to provide time controlled means insuring complete operation of change dispensing action by the change making mechanism.

A still further special object of the invention is to provide time controlled means for resetting the credit mechanism to zero setting after change has been dispensed.

Another special object of the invention is to reset the credit mechanism to zero setting on the insertion of a coin in case the previous user had credit in the machine at the end of his transaction and did not obtain the change.

Although the invention may be used for vending articles of any nature, it possesses high utility in dispensing stamps.

A further special object of the invention is to dispense stamps in varying desired quantities of any of a number of denominations.

While it has heretofore been proposed in Brinkerhoff Patent No. 1,555,100, dated September 29, 1925, to construct a mechanically operated vending machine intended to perform some of the operations of the present invention, the numerous operations required necessitate so complicated a mechanical construction as to render the commercial production of such a machine prohibitive and require the skill and endless labor of a highly trained mechanic to service. The present electrical machine can be manufactured at much lower cost, has a higher operating efficiency and can be serviced in a minimum of time.

A further object of the invention is to provide a completely electrically controlled vending machine.

A still further object of the invention is to provide an electrically operated vending machine which does not require the use of a rotary motor as the motive power for any of its mechanisms, and wherein the various mechanisms are operated in suitable interdependent relation and proper sequence through a number of simple electrical actuators, such as electric solenoids, and an appropriate control system. The control system for the machine necessarily makes use of a multiplicity of electric circuit makers and breakers in its various branches. These are designed to be simple and rapid in operation so that in view of the similar characteristics of the actuating devices employed, the complete operating cycle of the machine is carried out efficiently and quickly. Cam operated, solenoid operated, and, in a few instances, coin operated contact switches are employed so as to avoid the necessity of complicated rotary electric contact wheels and drums.

My invention will be further understood by reference to the accompanying drawings, in which:

Fig. 8 is a top view of the credit mechanism;

Fig. 9 is a sectional view of the credit mechanism on the line 9—9 of Fig. 8;

Fig. 10 is an end view of the credit mechanism;

Fig. 11 is a detailed view partly in section of the credit mechanism;

Fig. 12 is a view of the credit mechanism partly in section;

Fig. 13 is an end view of the credit mechanism partly broken away;

Figure 17:
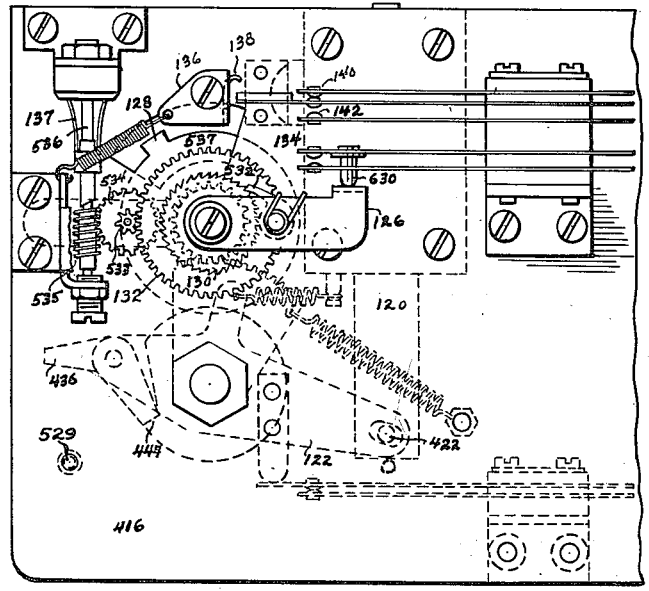
Figure 18:
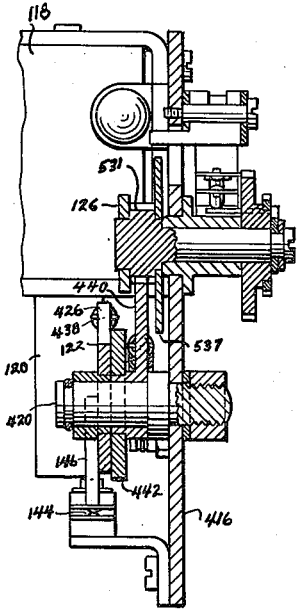
Figure 19:
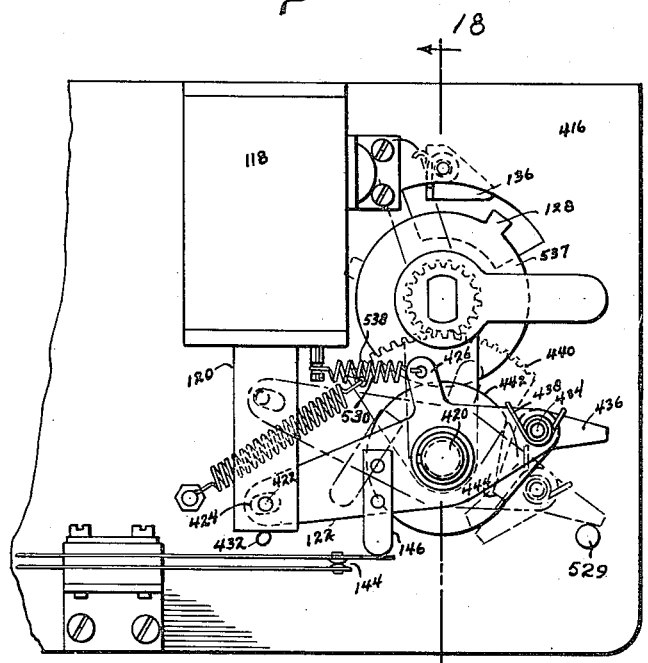
Figure 24:
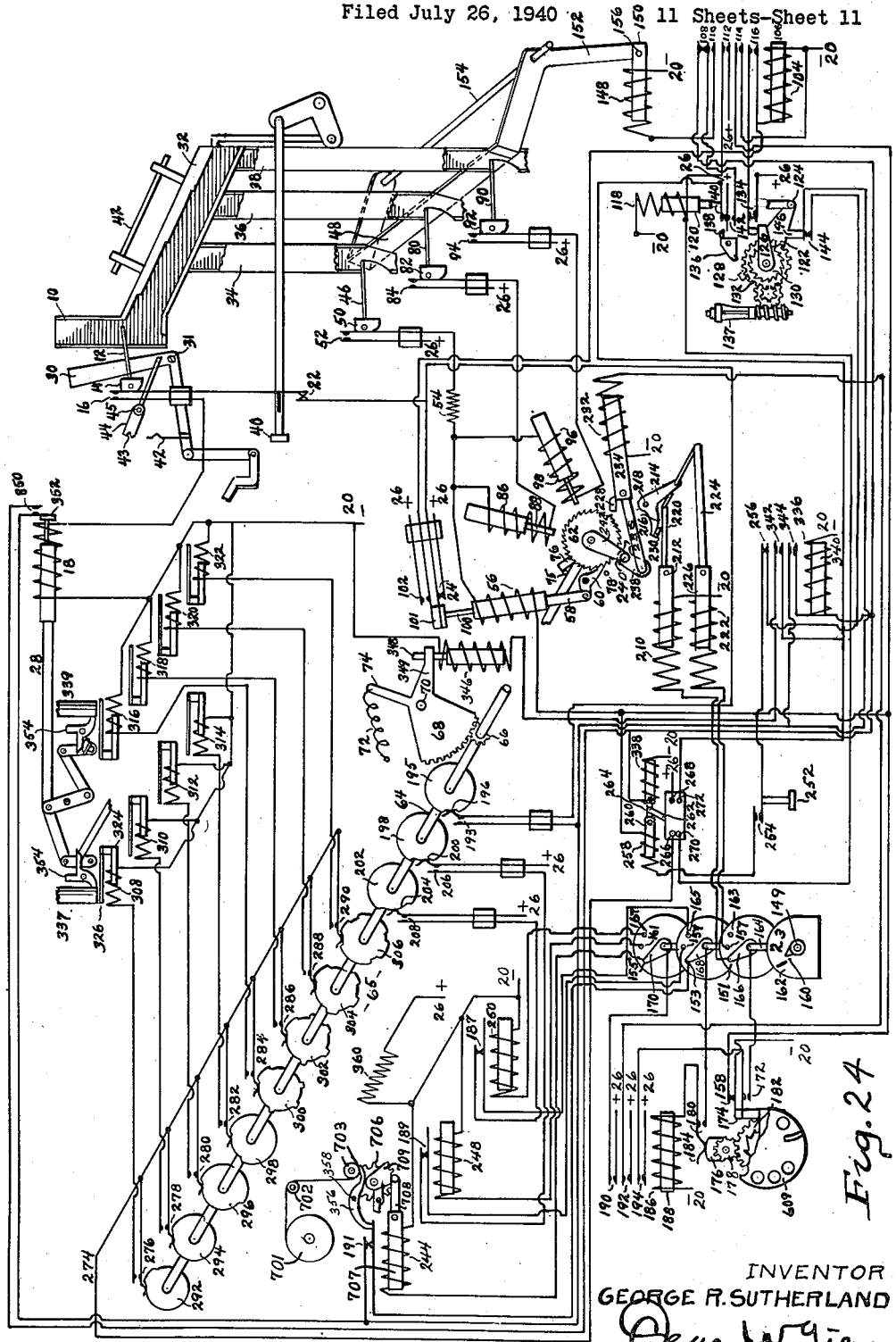

Fg. 14 is a detail view of part of the credit mechanism;

Fig. 15 is a sectional view of the credit mechanism on the line 15—15 of Fig. 13;

Fig. 16 is a detail view of part of the credit mechanism;

Fig. 17 is a side view of the time controlled mechanism;

Fig. 18 is a sectional view on the line 18—18 of Fig. 19;

Fig. 19 is a side view of the time controlled mechanism;

Fig. 20 is a sectional view of the coin receiving mechanism;

Fig. 21 is a sectional view on the line 21—21 of Fig. 20;

Fig. 22 is a sectional view on the line 22—22 of Fig. 20;

Fig. 23 is a sectional view on the line 23—23 of Fig. 20;

Fig. 24 is a diagrammatic showing of the operating parts of the machine with the electrical control circuits involved.

Figure 1:
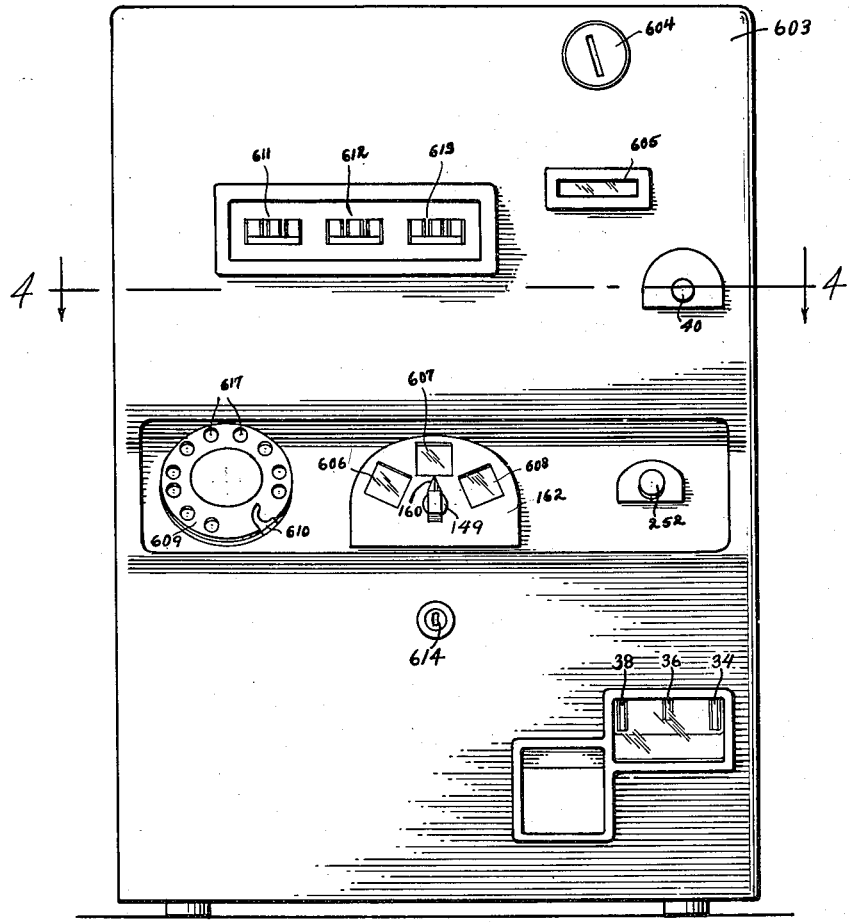
Fig. 1 is a front elevation of the machine embodying my invention.

As shown in the drawings, the invention is housed in a casing provided with a rear wall 601 which is shaped to form with plate 616 the bottom of the casing. Enclosure 603 forms the top, side and front walls of the housing. Enclosure 603 is hinged at the top of the rear wall 601 by arms 602. The entire enclosure 603 can be raised for servicing the machine and replenishing the supply of articles to be dispensed as well as the supply of coins for the change making mechanism. The enclosure is normally locked shut by lock 614. As shown in Fig. 1, the operating controls are placed at the front of the machine.

In the upper part of the front wall is slot 604 for receiving coins from the purchaser. Button 40 is provided for the purpose of clearing the coin receiving mechanism of defective coins or slugs which are returned to the change receptacle 518 at the lower part of the machine.

Control pointer 160 is utilized to select the type of stamp to be purchased, and may be turned to any of windows 606, 607 or 608 in which the desired stamp may be exhibited.

Control dial 609 is used to obtain the desired number of stamps selected by pointer 160. This dial is of well known construction and is operated in the conventional manner by engaging one of the apertures 617 with the finger and rotating the same to the stop 610 whereupon the dial is released and returns to a condition of rest.

The stamps are delivered by suitable feeding mechanism at dispensing stations 611, 612 and 613. One type of stamp is deliverable at each station, as selected by pointer 160, in the number desired, as selected by dial 609.

Button 252 may be operated by the user in order to obtain the change to which he is entitled. The change is delivered in change receptacle 518.

After passing through the coin receiving mechanism, the coin deposited by the user is exhibited at window 571 where it is retained until the coin of the next user passes through the coin receiving mechanism.

In case there exists an insufficiency of coins in the change making unit for dispensing correct change for another transaction, the machine is automatically thrown out of operation, and a sign to this effect is exhibited at window 605.

*The coin receiving mechanism*

The machine is adapted to receive coins of various denominations. Although it would be possible to provide coin receiving slots for coins of each denomination, for the convenience of the user I provide a single slot together with a coin separator adapted to separate the coins according to their denomination. After passing through the selector means, the coins may be tested to eliminate slugs and then actuate electrical switches.

The coin separator is shown in Figs. 20, 21, 22 and 23, and also appears in the sectional views of the machine in Figs. 3, 4, 5 and 7. After insertion through slot 604 the coin passes down the chute 10 into inclined separator 32. During travel through chute 10 the coin engages arm 12 and thereby rotates cam 14, as shown in Fig. 24. This closes switch 16, as will be described later in connection with the operation of the machine.

As shown in Fig. 21, the coins ride on ledge 502 of inclined wall 501. The coins are sized by engagement with the selector plate 503 positioned above ledge 502. Shoulder 504 deflects the quarters into chute 525. Shoulder 505 deflects nickels into chute 524. Shoulder 506 is adapted to deflect pennies mistakenly inserted into the machine. These pennies drop into chute 526 from which they are led to coin return chute 517 for conducting them to the coin return receptacle 518. At the end of the coin separator is chute 523 for receiving dimes.

As shown in sectional view in Fig. 23 member 527 is provided for cooperating with shoulder 504 for leading the quarters to chute 525. Similarly, member 528 is provided to cooperate with shoulder 505 for leading nickels to chute 524.

Selector plate 503 is spaced above ledge 502 so that genuine coins are properly deflected, but offsize slugs not deflected will be jammed in the separator unit. These jammed slugs may be removed by suitable mechanism.

For this purpose, plate 501 is journaled on the fixed member 507 and is normally pressed toward wall 508 by spring 509. Plate 501 may be swung away from wall 508 by arm 510. Arm 510 is actuatable by button 40 through links 511, 512 and lever 513 pivoted on screw 514. (See Fig. 7.)

When plate 501 is rotated by actuation of button 40, the aperture 515 provided therein is brought past deformed portion 516 of the fixed member 507. This forces a slug which is jammed between ledge 502 and selector plate 503 away from plate 501 so that it falls into the coin return chute 517 through which it is led to receptacle 518. This operation is shown in Fig. 21, where the deflected position of plate 501 is shown in dotted line.

For the elimination of spurious coins which are not jammed in the coin separator, slug detectors may be provided. These are of conventional construction and may be purchased on the open market. In the machine slug detectors 520, 521 and 522 are positioned to receive the coins from chutes 523, 524 and 525. (See Fig. 3.) Spurious coins are retained by the slug detectors and may be released by actuation of button 40 which operates through arms 513 and links 512. Nickel and dime slugs are led to the change receptacle 518 by chute 572 and quarter slugs by chute 573. (See Fig. 5.) After traversing the slug detector 522, quarters fall into chute 34 and engage arm 46 for closing switch 52. Similarly nickels traverse slug detector 521, fall through chute 36 where they engage arm 80 to close switch 84, and dimes traverse slug detector 520, fall into chute 38 and engage arm 90 to close switch 94.

Figure 7:
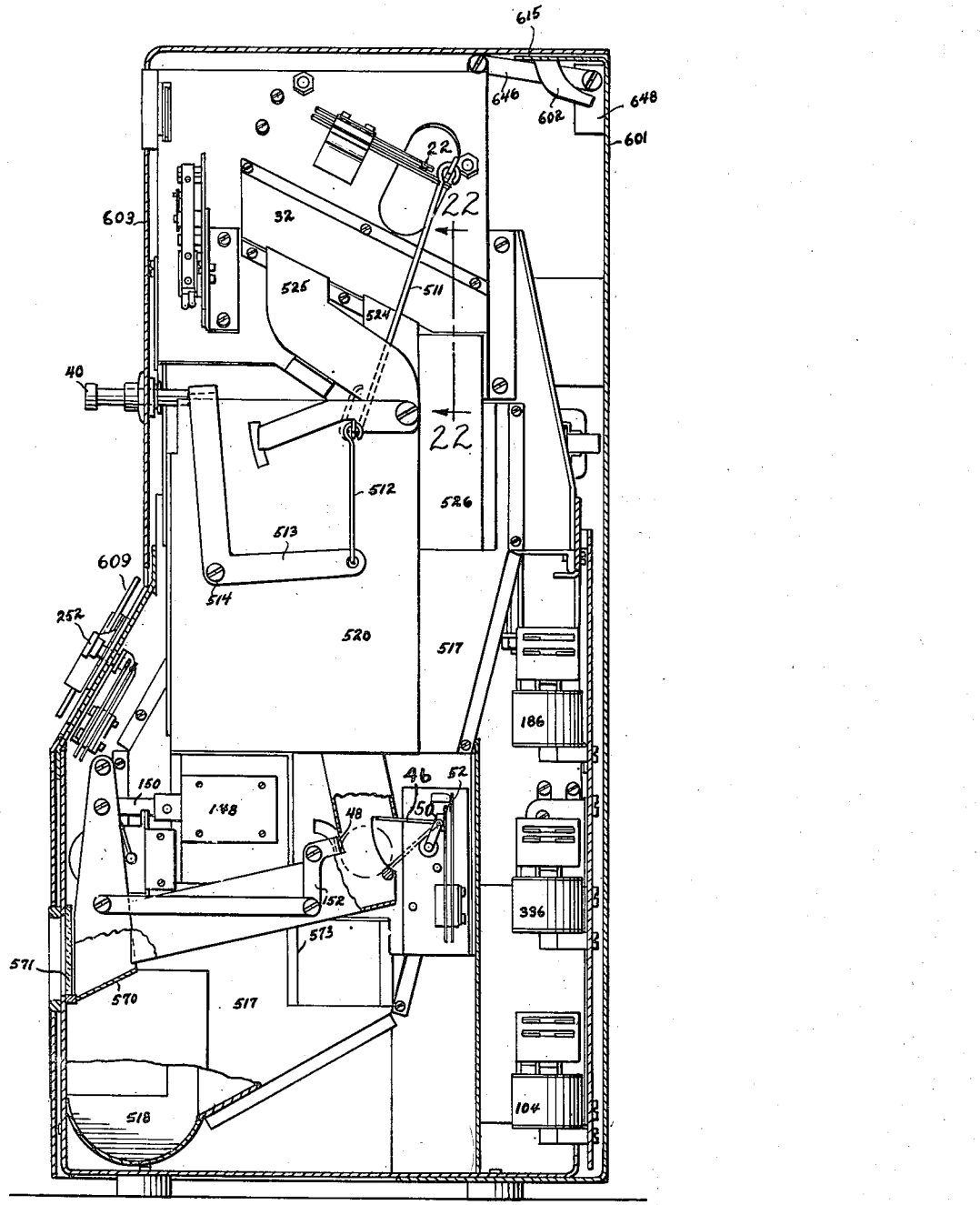
Fig. 7 is a sectional view on the line 7—7 of Fig. 5.

The coins engaging the switch arms are supported thereby in cooperation with bar 48. Bar 48 is actuatable by armature 150 of solenoid 148. Under the operation of the solenoid, bar 48 pivots on shaft 154 and releases the coin which is led to coin exhibitor 570, as shown in Fig. 7. Upon release of the coin the spring switches open and raise the arms for actuation by a succeeding coin.

Solenoid 148 is used to actuate coin exhibitor 570 as well as bar 48. Through the operation of the solenoid exhibitor 570 is retracted from window 571 so that the coin is dropped to the bottom of the casing.

*The credit mechanism*

The credit mechanism and portions thereof are shown in Figs. 8, 9, 10, 11, 12, 13, 14, 15 and 16. A frame 63 is provided upon which the parts are mounted. The general shape of frame 63 may be easily seen from the top view of Fig. 8 a side view Fig. 10 and a vertical section, Fig. 15.

The credit drum is composed of fiber discs or cams 65 which are fixed to the shaft 64 and are held in alignment by the pin 362 as shown in Fig. 15. The shaft 64 rotates in fixed bearing 364 and in removable bearing 366. The bearing 366 is fastened to the plate 368 which fits over the opening 370 in the frame 63. The opening 370 in the frame 63 is to allow introduction of the credit drum 65 while assembling the mechanism. The plate 368 also bears a guide piece 372 which fits in the notched portion 374 of the shaft 64 to prevent lateral movement of the credit drum 65 when the latter has been added to the assembly. Fixed also to the shaft 64 is pinion gear 66 as shown in Figs. 9, 12 and 15.

A gear segment 68, bearing two arms 74 and 349, is pivoted to the frame 63 at 70 as shown in Figs. 9 and 15. Spring 72 is tensioned between the arm 74 of the segment 68 and pin 376 as shown in Figs. 8 and 13, and the gear segment 68 is thus normally urged in a counter-clockwise direction. Gear segment 68 is linked to pinion gear 66 on the credit drum shaft 64 and consequently the credit drum is urged in a clockwise direction by the action of spring 72.

The solenoid 346 is attached to the frame 63 as shown in Fig. 8. The hook-shaped arm 348 is a part of the armature contained within solenoid 346. The arm 348 is in engagement with arm 349 of the gear segment 68 and, except when energized, merely rides on the arm 349 as it moves under the influence of the spring 72 shown in Fig. 13. When solenoid 346 is energized the armature and arm 348 is pulled downwardly to rotate the gear segment 68 against the tension of spring 72 in a clockwise direction. The credit drum 65 is, of course, rotated in a counter-clockwise direction.

The portion of shaft 64 which extends to the right of frame 63 as shown in Fig. 15 has fixed to it the ratchet wheel 62 and the lug 76. The nut 378 and the key 380, as shown in Figs. 15 and 11, hold the lug 76 and ratchet wheel 62 fixed to the shaft 64. Freely rotatable on shaft 64 is arm 242' as shown in Figs. 11 and 15. The arm 242 carries a pivot pin 240 about which the pawl 238 is turnable. There are also two springs 382 and 384 attached to the pivot pin 240. The spring 382 is tensioned to screw 386 on the frame as shown in Figs. 10 and 13 and tends to urge the arm 242 in a clockwise direction about shaft 64. The spring 384 is a small coil spring wound about pivot 240, one end of which is hooked over arm 242' and the other end of which bears upon the pivot 388 on the pawl 238. The pawl is thus biased to the position shown in Fig. 11 with pivot 388 stopped by arm 242. The arm 236 is connected by means of pivot 388 to the pawl 238. Since the spring 384 is much lighter than spring 382 the pawl rotates on pivot 240 into engagement with ratchet wheel 62 before arm 242 yields under the tension of spring 382 whenever arm 236 is urged to the left in Fig. 11.

The arm 236 is pivoted to armature 234 at 390 and whenever solenoid 232 is energized, the armature 234 and its arm 236 will be drawn toward the solenoid as shown in Fig. 13. When solenoid 232 is deenergized the arm 242 and associated parts are pulled back by spring 382 to the original position against stop 78. The pawl 238, together with its associated parts is movable within limits formed by stop 78 and stop 228 attached to the frame, which limit may be shortened by use of stop 214 positioned alone against stop 228 or together with stop 216. The adjustment of stop 228 is made so that the energization of solenoid 232 will result in a rotation of ratchet wheel 62 through an arc equivalent to three consecutive teeth of the wheel. When stop 214 is pivoted about 218 until it rests against stop 228, the effective distance through which the pawl 238 can travel is lessened by one tooth, that is the distance traveled is equivalent to two teeth as shown in Fig. 13. If both stop 216 and 214 are positioned against stop 228, the pawl 238 can rotate the ratchet wheel 62 but one tooth.

The ratchet wheel 62 is kept from returning in a clockwise direction, until such action is desired, by master pawl 60 which is pivoted to the frame by pivot pin 392. Master pawl 60 is biased toward ratchet wheel 62 by spring member 394 as shown in Fig. 12. Under the counter-clockwise rotation of ratchet wheel 62, as in Fig. 10, the pawl 60 merely oscillates on its pivot 392, and pin 396, fixed to pawl 60, oscillates within the slot 398 in arm 58. Whenever solenoid 56 is energized the armature and associated arm 58 are urged upwardly and the pawl 60 is disengaged from the ratchet wheel 62.

In addition the extension 100 attached to the armature 58 rises and carries with it an insulated member 101. The spring contact 24 is biased to closed position but upon the raising of member 101 the contact 24 is broken and contact 102 is made. Since the drum 65 is under spring tension to rotate in a clockwise direction as viewed in Figure 9, the associated stop 76 and ratchet wheel, when released, will rotate in a clockwise direction to set up credit in the machine until stop 76 strikes one of several other stops. These stops are stop 78 for twenty-five cent credits, armature 98, if solenoid 96 is energized, for ten cents credit, and armature 88, if solenoid 86 is energized, for five cents credit. Armatures 88 and 98 are each provided with recesses 88' and 98' in which stop 76 engages. The lateral pressure exerted on the armatures by stop 76 coacting with the lower surfaces of the recess is sufficient to prevent retraction of the armature by its retracting spring when the electric solenoid is deenergized. As will later be described, this holds the ratchet wheel 62 stationary while pawl 60 is brought into engagement with it. Armatures 88 and 98 are released on reverse rotation of stop 78 by solenoid 232.

Each tooth in the ratchet wheel 62 is equivalent to one cent credit and credit can be established only in five cent, ten cent or twenty-five cent increments. Where it is desired to take a toll, for example, of one cent, the position of stop 76 is so adjusted that when credit is established there will be only four, nine, or twenty-four cents credited upon the introduction of the corresponding coin. The subtracting solenoid 232, as stated before, may subtract credit from the drum in one, two, or three cent decrements until the stop 76 again rests in its initial or zero position against stop 75.

The stops 214 and 216 are actuated by solenoids 222 and 210 as shown in Figure 14. Stop 214 may be swung into position against stop 228, Fig. 10, by solenoid 222 when energized. Armature 226, and arm 224 pivoted thereto at 400, are moved to the left in the drawings, and through pivot 402 stop 214 is rotated into position. Upon deenergization of solenoid 222, stop 214 is returned to the position shown in Fig. 10 by spring 404 tensioned between pivot 402 and peg 406 attached to the frame 63. A similar arrangement exists in the case of solenoid 210, the similar parts being armature 212, arm 220, pivot 407, stop 216 and spring 408, as shown in Fig. 14. Both stops 214 and 216 are pivoted on a common pin 218. The shape of stop 216 is slightly different from that of stop 214, however, in that a portion 230 is formed to engage the underside of stop 214. Thus, when solenoid 210 is energized stop 216 is raised into position, carrying with it stop 214.

A part of the credit mechanism are the spring switches biased to open position and indicated generally by 410 in Fig. 9. These contacts are made of spring material and are mounted on frame 63, but are insulated therefrom by nonconducting pieces 412. One side of each spring switch member 410 is provided with a bent portion 414 which rests against the periphery of its respective disc. If the portion 414 is riding on a high portion of the disc the contact will be closed and if on a low portion the contact will remain open. As will be explained, these switches set circuits to change making mechanism solenoids so that they may be energized to deliver change in value equal to the credit setting of the credit mechanism.

I provide contact switches 193, 206 and 208 which are closed by circular cams when a credit setting over a desired minimum is present on the credit mechanism.

I also provide spring contact switches 24 and 102 operated by extension 100 of armature 68. Upon energization of solenoid 56 switch 24 is opened and switch 102 is closed, as described.

*The change making mechanism*

In order to dispense the desired amount of change to the user of the machine, I provide a change making mechanism. This consists of coin tubes in which a supply of coins is placed and means for feeding the coins from the tubes to the change receptacle. The change making mechanism is shown in Figs. 2, 3, 4, and 6.

In the embodiment shown, coins up to a value of twenty-five cents are received. For the use of the machine a toll of one cent is taken; and the user may if he desires obtain change of twenty-four cents if he decides not to purchase any stamps. In order to make up any sum up to twenty-four cents, I provide four coin tubes for nickels and four coin tubes for pennies. By selecting the proper combination of tubes, it is possible to provide the correct change by feeding one coin from each of the selected tubes. It will be understood that if it is desired to accept coins of larger or smaller values than twenty-five cents, a similar arrangement involving a greater or fewer number of coin tubes could be used.

As shown in the drawings, I provide four penny tubes 339 and four nickel tubes 337.

Figure 2:
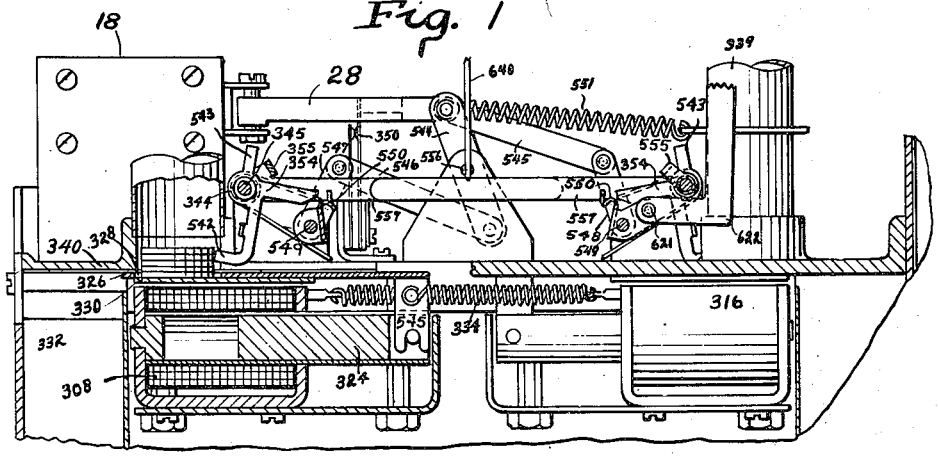
Fig. 2 is a detailed sectional view of the change making mechanism.
Figure 3:
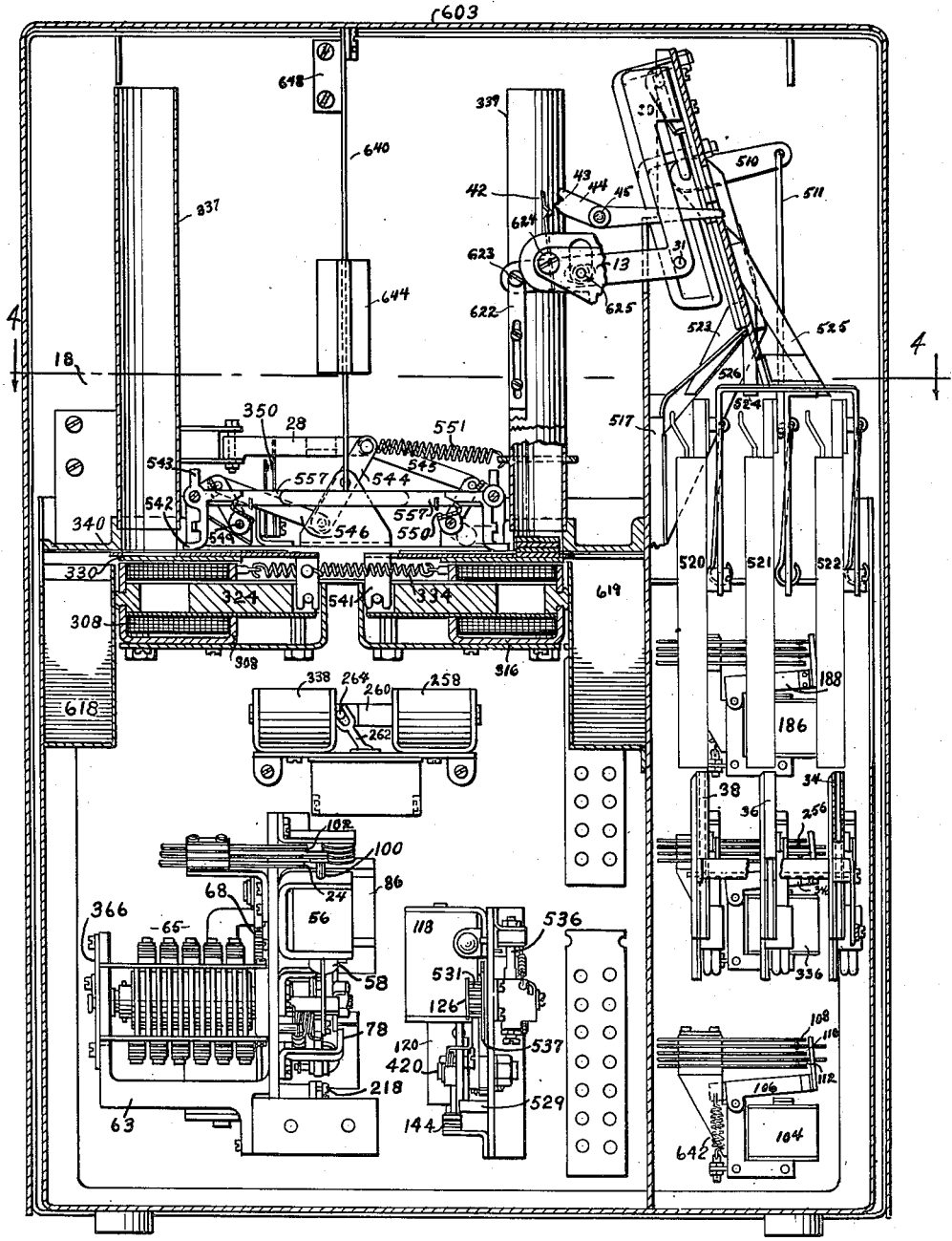
Fig. 3 is a vertical sectional view of the machine taken on the line 3—3 of Fig. 4.

As shown in Fig. 2, the stacked coins are supported on plate 330, spaced below member 340 enough to allow one coin to pass between the two. Stripper plates 326 slide between plate 330 and member 340 and are provided with apertures 328 surrounding the bottom coin. On movement of the stripper plates the bottom coin is pushed beyond plate 330 and is allowed to drop into coin delivery chute 332. As shown in Fig. 3, the nickels are delivered to chute 618 and the pennies to chute 619 leading to the coin receptacle. Separate actuation of the stripper plates is obtained by providing an individual solenoid for actuating each plate. As shown in Fig. 2, solenoid 308 attracts armature 324 engaging arm 541 on the stripper plate. After actuation by armature 324, the stripper plate is retracted by spring 334 and the next coin drops into aperture 328 of the stripper plate.

In order to prevent the operation of the machine when full change can not be delivered to the users, I provide means for detecting a deficiency of coins in the coin tubes. These comprise feeler members 344 journaled on rod 345. The feeler members are formed with arms 542 each of which extends through a slot in the coin tube and engages coins. The feeler members are also each provided with arm 354 which is normally horizontal, and upwardly extending arm 543. Arm 354 is normally supported by member 550 carried on rod 549.

To detect a deficiency in the coins, member 550 is rotated away from arm 354 so that detector arms 542 engage the coins. Detector arms 542 are brought into engagement with the coins by the weight of arms 354. If any tube is empty, the feeler arms 542 swing into the coin tube and arm 354 is correspondingly lowered so that its abuts against member 550 on the latter's return toward its normal position.

Member 550 is rotated by solenoid 18 through connecting rod 28. Link 545 connects rod 28 to arm 548, and link 544 pivoted at 556 operates arm 547 through link 546.

Rod 28 is spring biased to the position shown in Fig. 3 by spring 551 and may be retracted by solenoid 18 as is shown in Fig. 2.

When the coin tubes all contain sufficient coins for further operation, these coins support feeler arms 542 so that under actuation of spring 551 members 500 slide up under arms 354, but if a tube is exhausted, its feeler arm 354 drops, and, as just described, limits the return travel of rod 28.

Figure 5:
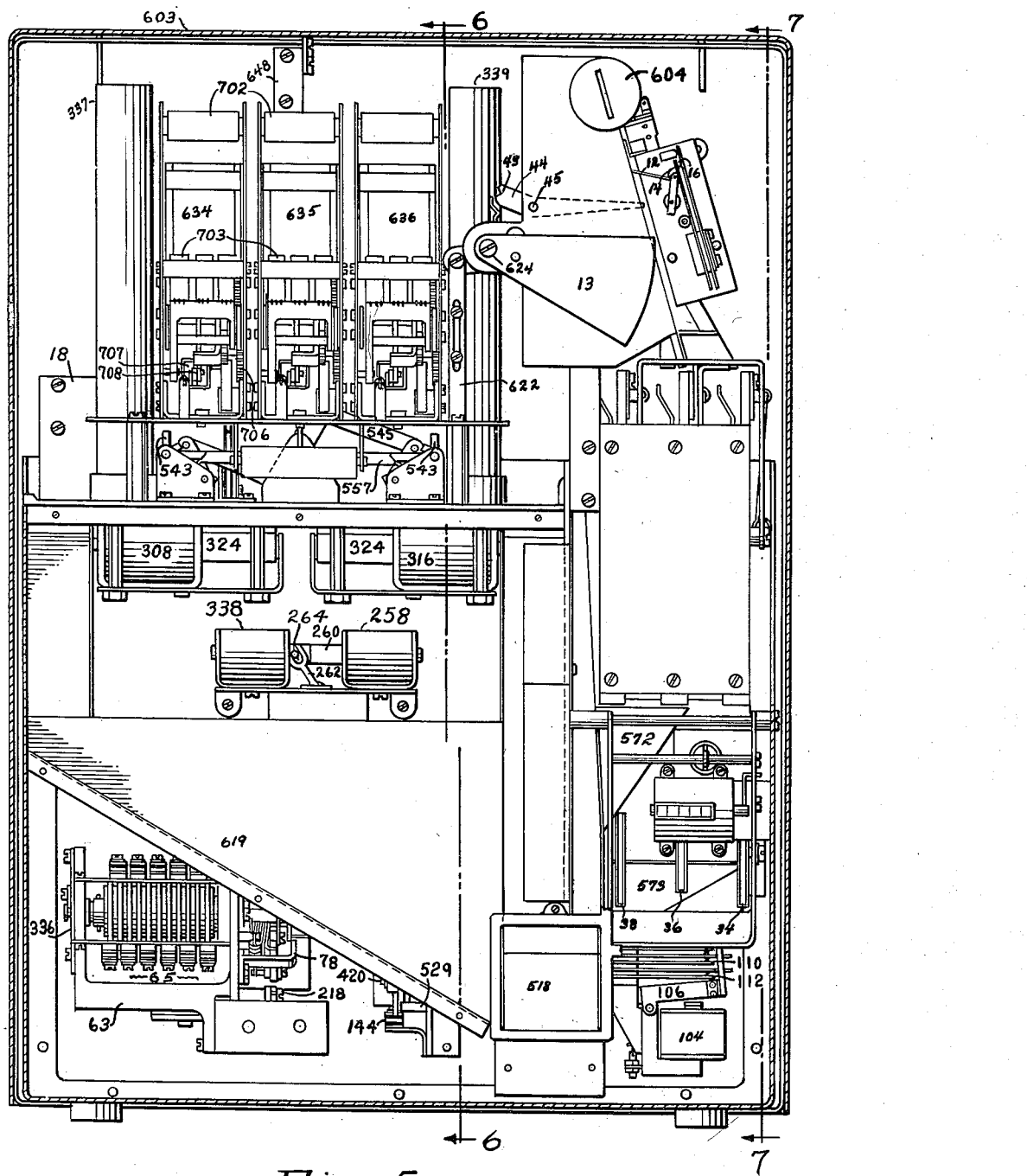
Fig. 5 is another vertical sectional view of the machine taken on the line 5—5 of Fig. 4.

In order to prevent the insertion of more than one coin at a transaction, I provide means for closing the coin slot after the reception of the coin. This operation is performed by solenoid 18. As described above, switch 16 is closed by the coin on its introduction into the coin separator. Arm 12 rotates cam 14 so that its flat surface 620 engages the switch and holds it closed. As shown in Fig. 24, this energizes a circuit to solenoid 18. As described above, actuation of solenoid 18 rotates shaft 549 shown on the right in Fig. 2, which elevates pivot 621 and link 622. As shown in Figs. 3 and 5, link 622 is pivoted to slot closer 30 at 623. Elevation of link 622, therefore, rotates slot closer 30 on pivot 31 to close the slot to the deposit of further coins.

The rotation of slot closer 30 is utilized to operate vane 13 carrying a notice to the effect that the machine is out of operation. In the normal position, as shown in Fig. 5, vane 13, pivoted at 624, is positioned so that the sign is not exhibited through window 605. On actuation of solenoid 18, rotation of slot closer 30 which is linked to vane 13 at 625, as shown in Fig. 3, raises the vane so that the sign is carried above window 605 and is not exhibited.

In case the feeler arms detect an insufficiency of coins in one of the coin tubes, members 550 prevent the full return of connecting rod 28 to rest upon deenergization of solenoid 18. The return movement is sufficient to allow vane 13 to take an intermediate position so that the sign is exhibited, and slot closer 30 is not retracted sufficiently to open the coin slot.

I also provide spring member 42 which is attached to the slot closer 30 for resetting switch 16 upon denergization of solenoid 18. Arm 12 of switch 16 is raised by member 44, pivoted at 45, and engaged in notch 43 by member 42.

I also provide, as will be explained in connection with the operation of my machine, switch 350 which is closed upon energization of solenoid 18 by connecting rod 28. Switch 350 is opened by the deenergization of solenoid 18 regardless of whether or not the full retraction of connecting rod 28 is permitted by feeling members 542.

In order to avoid protrusion of feeler arms 542 into the coin tubes so that they will not interfere with the orderly stacking of the coins when the supply is replenished, members 555 journaled on rods 345 may be raised by members 557 to engage arms 543 of the feelers and thereby retract arms 542 from the coin tubes. Members 557 are urged upwardly by springs 558 (see Fig. 4), and during normal operation of the machine are latched under bar 640. As cover 603 is raised bar 640 rises through a slot in the horizontal portion 615 of rear wall 601 and releases members 557.

The time controlled mechanism

In order to effect complete and accurate operation of the machine, I provide time controlled mechanism for purposes to be described below in connection with the operation of the machine. The time controlled mechanism is shown in Figs. 17, 18, and 19.

I provide time delay solenoid 118 which on energization actuates armature 120 to raise the same. Armature 120 carrying pin 422 rotates arm 122 journaled on shaft 420. Movement of arm 122 immediately withdraws lug 146 and opens spring switch 144.

Pawl 436 carried by arm 122 engages seat 444 on sector 442 journaled on shaft 420. As sector 442 is rotated by pawl 436, the latter is brought into contact with fixed pin 529 which on further rotation carries the pawl out of contact with seat 444. Arm 122, with armature 120, is returned to rest by spring 538 upon deenergization of solenoid 118.

By action of pawl 436 sector 442 has been rotated through a limited angle against spring 530. Teeth 440 carried on sector 442 engage gear 531 to rotate the same and integrally attached arm 126. At the first rotation of arm 126, switch 134 was closed by the withdrawal of arm 126 from lug 630. Gear 531 rotates plate 537 carrying lug 128 which engages member 136. During rotation of plate 537 under actuation of solenoid 118 member 136 is merely deflected from the path of the dog.

As arm 126 rotates under actuation of solenoid 118 it carries pawl 532 which rides over ratchet 130.

When pawl 436 releases sector 442, spring 530 reverses its direction of rotation, and pawl 532 carried by arm 126 picks up ratchet 130 as arm 126 reverses. Ratchet 130 rotates gear 132, driving gear 533 mounted to rotate with gear 534. Gear 534 drives worm 535 on shaft 536 together with governor 137. Governor 137 limits the speed of rotation of shaft 536 so that the return of sector 432 to rest under actuation of spring 530 is delayed.

During the rotation of plate 537 under actuation of spring 530, lug 128 engages member 136 and rotates the same so that detent 138 engages spring 631 to open switch 140 and to close switch 142. When arm 126 is returned to rest and through lug 630 it reopens switch 134.

It will thus be seen that the time controlled mechanism is operative upon energization of solenoid 118 to close switch 134, and at the end of a fixed time interval to reopen switch 134 and also momentarily to close switch 142 and open switch 140. The functions of these switches together with that of switch 144 will be made clear below in connection with the description of the operation of the machine.

Article dispensing mechanism

I provide solenoid actuated article dispensing means flexibly adapted to deliver articles of a variety of types in the number desired.

As shown in Fig. 5 in the embodiment therein, three units 634, 635 and 636 are used, one for each type of stamp.

As shown diagrammatically in Fig. 24 stamps are supplied in rolls having perforations between each stamp. Such a roll is indicated at 701 from which the strip of stamps is led over guide roller 702 and around a toothed feed roller 703 which is also shown in Fig. 5. Feed roller 703 advances the stamp strip by engagement of teeth 704 in the perforations between the individual stamps and is actuated by a solenoid to feed out one stamp on each energization thereof.

For this purpose the feed roller 703 carries a gear 705 as shown in Fig. 5 which is engaged by gear 706. On energization of solenoid 244, its armature 707 is retracted, and through link 708 and pawl member 709 operating on gear 706 feed roller 703 is rotated the requisite amount.

Feed roller 703 is provided with grooves 710. Detector 356 is pivoted at 358 and is formed with narrow fingers aligned with grooves 710. The end of lever 356 opposite the fingers overbalances the other end and biases the fingers for movement into grooves 710. When the fingers enter the grooves switch 191 is opened by lever 356. However, when the stamp strip is present around roller 703 the fingers are held out of the grooves 710 by the stamp strip.

Consequently, switch 191 is opened when the stamp supply is exhausted and is employed for detecting such exhaustion as will be described in connection with the operation of the machine below.

Whereas only one dispensing unit has been described, it will be understood that all three units are of similar construction.

The dispensing mechanism is fully described in the joint application of Herbert Steen and George R. Sutherland, Serial No. 275,238, filed May 23, 1939. It will be understood that other dispensing mechanisms for various types of articles may be used in place of this unit.

The selector switches

As diagrammatically represented in Fig. 24 switch 158 for selecting the type of article to be dispensed operates a gang of three switches having movable contacts 166, 168 and 170. The movable contacts may be selectively set to form circuits that will be described in connection with the operation of the machine.

Dial 609 is of the conventional type and is described in further detail in the application of Harry C. Stearns, Serial No. 320,590, filed February 16, 1940.

As shown in Fig. 24, upon movement of dial 609 from rest, contact switch 172 is closed and contact switch 158 is opened. When the dial is released from its advanced position cam 176 is rotated and closes contact switch 180 the desired number of times. As will be described below, upon each closure of contact switch 180 a feeding solenoid in the dispensing mechanism is operated to dispense one stamp.

The relay mechanisms

In the operation of my machine I employ a number of solenoid actuated relays: the credit mechanism relay, the impulse relay, and the zeroizing relay. As shown at the right in Fig. 3 these relays are mounted at the back of the casing of the machine. The credit mechanism relay consists of solenoid 104 which is adapted to actuate armature 106. Movement of armature 106 is caused to actuate switches 108, 110, 112, 114 and 116, shown diagrammatically in Fig. 24. Spring 642 retracts armature 106 upon deenergization of solenoid 104 and resets the switches to their normal position.

The other relays 336 and 186 are similarly actuated but operate differently arranged contact switches as shown in Fig. 24.

Operation of the machine

The operation of the machine will be explained in reference to the circuits shown in Fig. 24.

A coin of five cent, ten cent, or twenty-five cent denomination is dropped in the coin chute 10. Separate chutes may be used for each of the denominations at the outset but the present structure is simpler and operates satisfactorily. The coin, in dropping downwardly, depresses the lever 12, rotating the cam 14 to close the switch 16. The cam 14 is not spring actuated, but because of flat surfaces on the cam's operating face it will remain in either an upper or a lower position of the lever. In the upper position the contact 16 is open and in the lower position the switch 16 is closed. The coin passes on after having closed the switch 16.

When switch 16 is closed solenoid 18 is energized through the circuit 20, 18, 16, 22, 24 and to the opposite pole 26. The armature 28 is urged toward the right, operating several independent mechanisms, one of which will be described at this point. The movement of the armature through a series of linkages causes the coin slot shut-off 30 to rotate about its pivot 31 in a clockwise direction. The upper end of the shut-off member closes off the coin slot (not shown in diagram) from within the machine to prevent insertion of another coin until credit is established on the credit mechanism. The coin passes down the inclined coin selector 32 from which it is allowed to drop into its proper vertical chute. Chutes 525, 524, 523 are for coins of the respective denominations twenty-five cents, five cents and ten cents. If a slug or offsize coin is placed in the coin slot and becomes jammed in the inclined selector 32, it may be removed by pushing button 40 which through a series of levers operates a scavenging device, as shown in Figs. 20 and 21, and previously described. The jammed coin is swept out of the side of the selector into the coin return chute and the switch 22 is simultaneously broken to deenergize solenoid 18 and allow the coin slot shut-off to fall back into normal position. Whenever solenoid 18 is energized, the spring 42 on the horizontal arm shut-off 30 engages a notch 43 in locking lever 44. When solenoid 18 is subsequently deenergized, spring 42 on the downwardly moving shut-off arm rotates the locking lever 44 in a counterclockwise direction about pivot 45. The opposite arm of the locking lever 44 engages tripping lever 12 and urges it back to a normal position ready for the next coin. Near the end of its downward movement, spring 42 disengages notch 43 and locking lever 44 is released, assuming again the normal position as shown in the diagram after having urged lever 12 to an operable position.

Standard coin testers, such as may be purchased on the open market, may be interposed between the coin selector and the individual chutes 34, 36 and 38. The rejected coins or slugs are passed into the coin return chute and the customer gets any such coins back.

If a twenty-five cent piece has been dropped in the coin slot, the selector will cause it to fall down to chute 34, jam against bar 48, and rest on lever 46, depressing the lever so that the cam 50, to which it is attached, closes contact switch 52. Current from the positive pole 26 is led through contact 52, resistance 54, solenoid 56, contact 158, and thence to the negative pole 20. Contact switch 58 is normally closed and is opened only when dial 609 is not at rest. It is to be understood that wherever positive terminals are indicated, they are actually joined to a common positive pole or to one terminal of an A. C. supply indicated by the numeral 26. All the negative terminals are likewise actually joined to a common negative pole or to the opposite terminal of an A. C. supply indicated by the numeral 20. The diagrammatic form used is purely to avoid unnecessary confusion in following the various circuits. The solenoid 56, now energized, raises the master pawl armature 58 and disengages the pawl 60 from ratchet credit wheel 62. The ratchet credit wheel 62 is rotatable within limits with the credit drum shaft 64 to which it is fixed. Pinion gear 66 is likewise fixed to shaft 64 and meshes with the gear segment 68. The gear segment 68 is normally urged in a counter-clockwise direction about its pivot 70 by spring 72 tensioned between the machine framework and arm 74 of the gear segment. When the pawl 60 is disengaged from the ratchet wheel 62 the wheel rotates in a clockwise direction as many teeth (less one if a toll is taken) as the value in cents of the coin inserted. The initial position of the ratchet wheel is zero credit and each tooth that the wheel advances in a clockwise direction sets up one cent credit. Conversely each retraction of the wheel results in a subtraction of one cent credit. Thus, if a quarter is inserted in the machine the ratchet wheel is released and rotates until the lug 76, which is secured to the wheel, engages stop 78, setting up twenty-five cents credit (or twenty-four cents if a one cent toll is taken) in the machine. If a nickel is deposited instead of a quarter, it falls into tube 36 and a similar action takes place. The nickel lies against the bar 48 and depresses lever 80, rotating cam 82, and as a result closing switch 84. The circuit established by this procedure is through switch 84, solenoid 86, solenoid 56, then through switch 58 to the terminal. The energized solenoids 56 and 86 work simultaneously, solenoid 56 releasing the ratchet wheel in a clockwise direction as explained before and solenoid 86 bringing its armature 88 down to such a point that it will stop the lug 76 and the ratchet wheel fixed thereto. The five cent solenoid has now established five (or four) cents credit on the credit drum. Similarly, if a dime were dropped into the machine it would be fed from the selector 32 to the tube 38 and actuate the lever 90 and the cam 92 to close the contacts 94. The dime solenoid 96 and the master pawl solenoid 56 will now be operated simultaneously to set up ten cents (or nine cents) credit in the machine. The energization of the dime solenoid and the master pawl solenoid take place through the contact switch 94, solenoid 96, solenoid 56 and through closed contacts 158 in connection with the dial 609.

Whichever coin was placed in the coin slot now lies in its proper tube resting on the cam arm which closes the circuit to the proper stop solenoid and the master pawl solenoid. The master pawl armature 58 at the end opposite the pawl has an extension 100. As the armature 58 is actuated by solenoid 56 the extension 100 biases insulated lug 101 attached to the spring contact switch members 24 and 102 so that the energization of solenoid 56 opens spring contact switch 24 and closes spring contact switch 102. As contact switch 24 is opened the circuit 26, 24, 22, 16, 18 and 20 is interrupted deenergizing solenoid 18. The armature 28 is under spring tension and upon the deenergization of solenoid 18 moves to the left, operating the coin slot closer 30 and the locking lever 44 exactly the same as above described where the contact switch 22 was broken instead of contact switch 24. In either event the same circuit is interrupted.

As the armature extension 100 closes spring contact switch 102 a new circuit is established from terminal 26 through contact switch 102 and credit relay solenoid 104 to terminal 20. The armature 106 is actuated by solenoid 104 to open contact switch 108 which is normally closed, and to close contact switches 110, 112, 114 and 116 which are normally open. The armature 106 performs the foregoing operations simultaneously and all of the operations in the credit relay are dependent on each other. The diagram represents the foregoing function merely in a schematic manner and it must be borne in mind that when any of the relay solenoids are energized all the contacts of the relay are shifted. The first circuit of a series of rapidly formed circuits is that through contact switch 112 from terminal 26 through time-delay solenoid 118 to terminal 20. The energized solenoid 118 raises armature 120 which is connected to the arm 122 at 124. Through a gearing mechanism not shown in the diagram, arm 126 and lug 128 are caused to rotate together in a clockwise direction while ratchet 130 and drive gear 132, which are fastened together, remain stationary. The instant that arm 126 is caused to rotate in a clockwise direction the spring contact 134 which was held open by arm 26, is allowed to close and remains closed until arm 126 returns to its original position. During this period a circuit is established through contact switch 134 from terminal 26 through contact switch 116, which is now closed by credit relay solenoid 104, through solenoid 104 to terminal 20. Thus it is seen that this circuit is a self-locking circuit which can not be interrupted until arm 126 of the time-delay mechanism has returned and opened contact 134. As the arm 126 and lug 128 continue in the clockwise direction under the influence of the rising armature 120, the lug 128 strikes the dog 136 which is merely displaced by a limited counter-clockwise rotation until the lug clears the extended portion of the dog. The dog 136 resumes the position as shown in the diagram without having performed any function on the clockwise stroke of the lug 128. As the armature 120 nears the end of its upward stroke the arm 126 and lug 128 are released through a mechanism shown in detail in Figs. 17, 18 and 19 and explained under the discussion of Time controlled mechanism. Under spring tension arm 126 and lug 128 return to normal position rotating governor 137 through the ratchet wheel 130 and connected gearing. However, as lug 128 passes dog 136 in a counter-clockwise direction the dog is caused to rotate oppositely. (See Fig.

6.) While so doing the hooked portion 138 of the dog opens contact switch 140 and closes contact switch 142. Contact switch 144 is normally closed by lug 146 on arm 122, but when arm 122 is not at rest or in a lower position, that is, at all times that solenoid 118 and armature 120 are energized, contact switch 144 is open.

Contact switches 140 and 144 have no function at this instant in the operation of the timing mechanism but enter into the picture on the second operation of the timing mechanism as will be explained later. The opened contact switch 108 and the closed contact switch 114 in the credit relay likewise have no function at this time.

As contact switch 142 is momentarily closed by the dog 138 a circuit is established through it from terminal 26, through contact switch 110, coin-release solenoid 148 to terminal 20. The energized solenoid 148 retracts the armature 150 and rotates the U-shaped bar 48 in a clockwise direction about pivot rod 154 by means of connecting arm 152 which is an extension of the U-shaped bar 48 and is pivoted to the armature 150 at 156. The coin which was responsible for energizing the foregoing circuits may be resting on one of three levers 46, 80 or 90 depending on the coin's denomination, but in any case it is released when the bar 48 is rotated in a clockwise direction and it falls down the chute to the money box. Since the contact switch 142 is established but momentarily, bar 48 drops back immediately upon deenergization of the solenoid 148. The particular lever upon which the coin was resting was holding one of three spring contact switches 52, 84 or 94 closed by means of a cam 50, 82 or 92. When the coin drops, the spring contact pressure against the cam is sufficient to raise the lever to its normal horizontal position and the contact which was held closed is again opened. The master pawl solenoid 56 is now deenergized when the coin drops past bar 48. It will be remembered that no matter of what denomination the coin was the circuit which it closed while jammed against bar 48 included master pawl solenoid 56, either alone, in series with nickel solenoid 86, or in series with dime solenoid 96.

As the master pawl armature 58 falls back to normal when solenoid 56 is deenergized, the pawl 60 engages a tooth of the ratchet wheel 62 holding it stationary at whatever position it assumed while credit was being established. It will be observed that in the case of five cents or ten cents credit, where armatures 88 and 98 respectively engage lug 76 of the ratchet wheel 62, there is a danger that the wheel will slip before master pawl 60 can engage the proper tooth. Since the nickel or dime solenoid is deenergized at the same instant as the master pawl solenoid, the lug 76 on ratchet wheel 62, under the rotational influence of spring 72, may slip by armature 88 or 98 which armatures are normally spring-retracted outwardly from the locus described by lug 76. To obviate this difficulty the end of armature 88 or 98 in contact with lug 76 is recessed at 88' or 98' so as to be held against the normal retractive spring pressure by the lateral portion of L-shaped lug 76. The foregoing details of mechanism are explained under the discussion on The Credit Mechanism and are best illustrated in Fig. 10.

Another function of master pawl armature 58 in falling back to the normal position, as shown in the diagram, is to break contact switch 102 and make contact switch 24. Obviously the making of contact switch 24 does not establish any circuit since when contact switch 24 was broken solenoid 18 was deenergized, restoring the coin slot close mechanism to normalcy and opening contact switch 16 of the same circuit as described above.

The breaking of contact switch 102, however, deenergizes the credit relay solenoid 104 which was energized through contact switch 102 from terminal 26 through solenoid 104 and to terminal 20. Since the time delay mechanism and more especially arm 126 of the time delay mechanism has returned to normalcy the contact switch 134 and the credit relay self-locking circuit from terminal 26, through contact switches 134, 116, 104 to terminal 20 is now open. There being no other circuit to energize the credit relay solenoid 104, the armature 106 returns under spring tension to normal position and opens contact switches 116, 114, 112, 110 and closes contact switch 108. The bars of contact switches as shown in the diagram are in this normal position. The opening of contact switches 116, 114 and 110 and the closing of contact switch 108 have no function at this time. However, the opening of contact switch 112 deenergizes the circuit 26, 112, 118, 20 so as to allow armature 120 to fall back to normal position. It will be remembered, however, that the downward motion of armature 120 is merely a latching operation since the time delay mechanism operated through a latch release at the upper limit of the stroke of the energized armature 120. The details of the mechanism are described under the foregoing heading Time controlled mechanism, and are best shown in Figs. 17, 18 and 19.

The user has done but one thing thus far in the operation of the machine, namely, putting a coin in the coin slot of the machine. The entire mechanism of the machine is now in exactly the same order as at the beginning of the operation except that the ratchet wheel 62 and the connected credit drum designated generally by 65 are in some position clockwise from the normal or zero credit position which is shown in the diagram. This clockwise position is indicative of credit established in the machine and is measurable in cents by the number of teeth which the ratchet wheel has been allowed to advance in the clockwise direction from the normal or zero credit position.

Article selection and delivery

The user now selects the denomination of the stamp desired which, in the present modification, is limited to one, two and three cent stamps but can clearly be extended to any number of denominations or types of stamps. The selector knob is shown at 149 and is rotatable to any of three positions as indicated by the pointer 160 attached to the knob 149 and the numerals or specimens of the three stamps at the positions indicated in the diagram on dial face 162. Rotatable with the knob 149 is non-conducting shaft 164 and the electrical conducting members 166, 168 and 170 attached thereto. The electrical conducting members 166, 168 and 170 are movable to three positions corresponding to the three positions of the knob 158. In the one-cent stamp position as shown in the diagram, the conducting members 166, 168 and 170 respectively make electrical contact with members 151, 153 and 155. In the two-cent position the members 166, 168 and 170 make contact with members 157, 159 and 161, respectively. Finally, in the three-cent position the respective contacts are 163, 165 and 167. Of these, however, contact 163 is merely a blank and does not serve to close any electrical circuit at any time.

The user having made his selection of the stamp denomination he desires, proceeds to dial the number of stamps of that denomination which he wants. The dial 609 and associated parts is much the same as that of a telephone dial. When the dial is in the zero or normal position contact switch 158 is closed and contact switch 172 is open. The moment the dial is operated or is in a position clockwise from that at rest, contact switch 158 is opened and contact switch 172 is closed by arm 174 rotating with the dial. The opening of contact switch 158 has no function at this time but the contact switch 172 established a circuit which is completed with each electrical impulse given by the dial on its return rotation. Assuming for the present that the user has selected the one-cent stamp denomination as shown in the diagram and that he has sufficient credit in the machine, let him dial for a desired number of these stamps. The number which he dials will determine the number of times cam 176 rotating with gear 178 will allow spring contact switch 180 to close and open. The pinion gear 178 is driven directly by drive gear 182 rotating with the dial 609 on its return stroke in a counter-clockwise direction. At the zero or normal position of the dial 609 the raised part of cam 176 is always in contact with the arm 184 of spring contact switch 180 to keep the contact open. Each closing of contact switch 180 results in an energization of impulse relay solenoid 186 and consequent movement of the armature 188 to close all the contact switches 190, 192 and 194 of the impulse relay. The circuit by which this is established consists of solenoid 186 from terminal 20 through contact switch 180, solenoid 186, contact switches 153, 191, 193, 24 and to terminal 26. The spring contact switch 193, which is biased to open position and is normally open at the zero credit position of the drum 65, is now closed because there is credit established in the machine. Switch 191 is closed because the stamp dispenser is loaded.

Cam disc 195 controls the operability of the penny stamp circuit, that is as long as there is at least one cent credit in the machine the spring contact switch 193 will be held closed, but at zero credit the notch in disc 195 allows spring contact switch 193 to open. With the cam disc 195, and of course, the rest of the credit drum, at zero position as shown in the diagram, no electrical impulse can be given impulse solenoid 186. Consequently, no one-cent stamps can be obtained from the machine by dialing member 609 unless there is at least one cent credit in the machine. If a greater number of one-cent stamps are dialed than credit will allow, the machine will stop dispensing when the disc 195 reaches the zero position shown.

Cam discs 195, 198 and 202 are credit-sufficiency determining discs. Cam disc 195, as just explained, determines when the credit setting is zeroized and no more one-cent stamps can be obtained. Cam disc 198 operates in connection with the two-cent stamp circuit established by rotating knob 149 so that pointer 160 coincides with the numeral 2 on the panel 162. It will be noted that the notch or portion of reduced diameter, 200 on cam disc 198 is slightly wider than the notch 196 in cam disc 195. Thus the ratchet wheel 62 can have an advance of one tooth, or one-cent credit, established on the drum but spring contact switch 206 biased to open position in the notch of disc 198 will still be open. If a user attempts to obtain one or more two-cent stamps with one cent or no credit in the machine, impulse solenoid 186 will not be energized and as a result he can obtain no stamps. Now, however, if the ratchet wheel 62 is advanced two teeth in a clockwise direction there is two cents credit in the machine and the notched portion 200 of cam disc 198 will have passed spring contact switch 206 which is then closed by the raised portion of the disc. If the user dials one or more two-cent stamps under this condition exactly one two-cent stamp will be dispensed and no credit remains.

Likewise the cam disc 202 and the notched portion 204 in its periphery determines whether there is sufficient credit for a three-cent stamp. If, while three-cent stamps are being vended, a point is reached where there is less than three cents credit remaining in the machine, spring contact switch 208 will be biased into the notch 204 and the three-cent circuit will be interrupted. The user now may turn the indicator 160 to a stamp of lesser denomination for which there is still enough credit in the machine, or he may get his cash change as will be described further on.

Returning now to the one-cent stamp circuit, solenoid 186 is energized with each closing of the circuit and the amendment movement of armature 188 closes all the contact switches 190, 192 and 194 as previously mentioned. Since the dial 609 is off its zero position, contact switch 172 is closed. With each impulse of the solenoid the impulse relay closes contact switch 194, establishing the circuit 194 from terminal 26, 180, solenoid 186, to terminal 20. As may be seen this circuit is merely a duplication of energization of solenoid 186 and depends on the closing of contact 180 to be established. The purpose of this duplicate energization is to lock solenoid 186 in an energized state for the full period that contact switch 180 is closed. This is necessary when, for instance, a three-cent stamp is dialed and a three-cent credit obtains. The credit-sufficiency determining disc 202, although closed at the beginning of the energization of solenoid 186, immediately opens at the two-cent position as above described and were there no self-locking circuit the solenoid 186 would not remain energized for the full pulsation period. The associated operation about to be explained would then be interrupted before their completion.

Another circuit established with the stamp selector in the one-cent position is that from terminal 26 through 194, 172, 166, solenoid 210 and to terminal 20. When the solenoid 210 is energized the armature 212 is pulled to the left of its position in the diagram. Stops 214 and 216 are rotated in a clockwise direction around pivot 218 by connecting arm 220. Stops 214 and 216 are mounted on pivot 218 but are not fastened together. (See Figs. 10 and 13.) Stop 214 can act independently of stop 216 but stop 216 can not act independently of stop 214. When solenoid 222 is energized, that is if the selector knob 158 and pointer 160 had been in the two-cent position instead of the one-cent position, arm 224 would have been actuated by armature 226 to rotate stop 214 against stop 228. However, when the solenoid 210 in the one-cent circuit actuates arm 220, the stop 216 carries along with it stop 214 because of the laterally extending lug 230 on stop 216 which catches stop 214. The purpose of stops 216, 214 and 228 is to determine the amount which will be subtracted from the credit drawn at each impulse of the solenoid 186 and each ejection of a stamp. The amount subtracted must, of course, be equal to the value of the stamp vended. In the above one-cent circuit the moment the energized solenoid 186 closes the impulse relay solenoid 210 is energized and the two stops 214 and 216 are snapped into position against stops 228. At the same instant another circuit is established through contact switch 192 from terminal 26, through subtracting solenoid 232 and to terminal 20. Armature 234 is drawn to the right and with it arm 236 which rotates pawl 238 about its pivot 240 in a counter-clockwise direction to engage the properly positioned tooth on ratchet wheel 62. The arm 242 to which the pawl 238 is pivoted at 240, pivots freely at its other end on shaft 64 with which ratchet wheel 62 rotates. After the pawl 238 engages the tooth of ratchet 62 the arm 236 continues to move to the right under the influence of energized solenoid 232, rotating ratchet wheel 62 and arm 242 in a counterclockwise direction. In this case, since the penny circuit is involved, stops 214 and 216 are positioned against stop 228 and the subtracting pawl 238 can subtract but one tooth. The energization of the stops 214 and 216 is simultaneous with that of the subtracting arm 236 but the design of the machine is such that the stops move freely into position in time to intercept the pawl 238 at the desired position as movement of the pawl is retarded in rotating ratchet 62 against the force of spring 72. The master pawl 60, at the same time, latches against the tooth next to the tooth with which it was previously in engagement and holds the ratchet wheel stationary after subtracting solenoid 232 is deenergized, and the subtracting pawl leaves its operative position and returns to the inoperative position shown in the diagram.

If the selector knob had been turned to establish the two-cent circuit, stop 214 alone would have been positioned against stop 228 by the action of solenoid 222. The circuit actuating solenoid 222 is from terminal 20 through conductor 166, now in contact with the center contact 157, contact switches 172, 194 and to terminal 26. As a result, the subtracting pawl 238 would have been allowed to subtract two teeth from the credit ratchet wheel 62.

Likewise if the selector knob 149 had been turned to the three-cent position on the plate 162 the conductor 166 would rest on point 163, establishing no circuit. In this case the pawl 238 would be allowed to travel the full distance to stop 228, subtracting three teeth from the credit ratchet wheel 62 and, consequently, three cents from the credit drum 65.

The third contact switch 190 of the impulse relay closes the circuit from terminal 26, contact switch 190, member 170, contact 155, one-cent stamp-vending solenoid 244 to terminal 20. Each closing of the impulse relay causes one one-cent stamp to be vended from the stamp vending unit 246 as described and set forth in copending application of Herbert Steen and George R. Sutherland, Serial No. 275,238, filed May 23, 1939. If the user had selected the two-cent denomination the circuit would be closed through solenoid 248 to vend a two-cent stamp from the vending unit adjacent the one-cent unit, not shown in the diagram. Likewise if the user had selected the three-cent denomination the circuit would be closed through solenoid 250 for vending three-cent stamps.

*Change making*

If, after having made the desired purchases, the user still has credit left in the machine, he may press the change button 252 to close the contact switch 254. The change, equivalent to the credit remaining in the machine, is delivered to him in the change cup.

The circuit which is energized to accomplish the latter originates at the contact switch 24 from terminal 26, contact switch 193, contact switch 144, contact switch 256, contact switch 254, solenoid 258, contact switch 158 and to terminal 20. It is to be noted that in order to energize the toggle switch solenoid 258 by pressing change button 252, three conditions must obtain. There must be at least one cent credit in the machine or contact switch 193, actuated by cam disc 195, will be open as shown in the diagram. Secondly, the dial 609 must be in its normal or inoperative position, as shown, so that contact switch 158 may be closed as previously described. Thirdly, the time delay solenoid 118 must have been deenergized so as to allow lug 146 to hold contact 144 closed. These conditions are to insure that no outside forces can influence the change-making circuit.

The toggle-switch solenoid 258 is now energized and armature 260 is pulled to the left. The lever arm 262 of the toggle switch is pivoted at 264 to the armature 260. When in the right position shown in the diagram the switch is open but when pulled to the left, contact is made between points 266 and 268, and between points 270 and 272. The contact between points 266 and 268 results in a circuit from terminal 26 to a conducting piece 274 to which are connected in parallel all the spring contact switches 276, 278, 280, 282, 284, 286, 288 and 290. These spring contact switches are actuated respectively by non-conducting discs or cams 292, 294, 296, 298, 300, 302, 304 and 306, which discs are fixed to shaft 64 and rotate therewith. The discs 292, 294, 296 and 298 control the circuits through the respective nickel stripping solenoids 308, 310, 312 and 314, while discs 300, 302, 304 and 306 control the circuit through the respective penny stripping solenoids 316, 318, 320 and 322.

When any of these stripping scolenoids are energized as for example solenoid 308, the armature 324 is drawn towards the solenoid. Attached to armature 324 is stripper plate 326 as best shown in Figure 2. The stripper plate is the same width as, or less than that of the type of coin it vends. The coin drops into an opening 328 in the stripper plate while it is in normal position as indicated in Fig. 2, and lies on a back plate 330 immediately behind stripper plate 326. The coin is in the same plane as stripper plate 326 and when the solenoid 308 pulls armature 324 to the left, stripper plate 326, moving therewith, displaces the coin laterally to a position beyond the edge of plate 330 where it is allowed to drop down the change chute 332. As the stripper plate 326 and associated armature 324 move to the right under the influence of spring 334 and the deenergization of solenoid 308, the next coin in the coin tube 337 drops into position in the opening 328. Though not shown in the diagram, there are coin tubes over each of the stripper plates, four nickel tubes over solenoids 308, 310, 312 and 314, and four penny tubes over solenoids 316, 318, 320 and 322.

Cam disc 306 of the credit drum closes the circuit to solenoid 322 to release a penny if there is one cent credit in the machine. If the credit drum 65 is rotated one more cent by ratchet wheel 62, a raised portion of cam disc 304 closes contact switch 288 in addition to the contact 290 which remains closed. Likewise at three cents and four cents credit the respective cam discs 302 and 300 add contact switches 286 and 284 to the first two. On energization of the change circuit four pennies, one from each of the four tubes, will be stripped therefrom.

Now, however, if there is five cents credit established on the drum, the turning of the drum 65 to the fifth tooth in the ratchet wheel 62 allows depressions in all the penny discs of the credit drum to open contact switches 284, 286, 288 and 290. At the same time cam disc 298 rotated to a position where the raised portion closed the spring contact 282. At five cents credit, therefore, one nickel is stripped, but no pennies are. As each succeeding cent is added to the credit of the drum 65 the four penny cam discs 300, 302, 304 and 306 go through the same cycle as described, the nickel contact 282 remaining closed for all credit of five cents or more. At the ten-cent credit position the penny contacts all open as before and contact 280 is closed by the raised portion in disc 296. Now if the change button 252 is pressed two nickels will be given in change. The cycle repeats up to twenty-four cents, four nickels and four pennies. Thus the maximum credit which can be established on this machine is twenty-four cents, resulting from the insertion of a quarter into the machine and a deduction of a one-cent toll.

At the time the toggle switch 262 was closed by solenoid 258, the circuit which energized the change-making mechanism was closed at the contact of points 266 and 268. As previously stated, the toggle switch is a double switch and contact is also made between points 270 and 272. The circuit established by this contact is through solenoid 118 from terminal 20, contact 270—272, contact switch 140 in the timing mechanism and to the terminal 26. The latter circuit sets the timing device in motion, in the same manner as previously described, by the energization of solenoid 118, and the action of armature 120. As the gear 132 returns to its inoperative position by counter-clockwise revolution, the lug 128 trips dog 136 and the contact switch 140 is interrupted momentarily while contact switch 142 is made momentarily. The circuit through contact switch 142 from terminal 26 is established through contact 108, since the credit relay solenoid at this time is not energized, through zeroing relay solenoid 336 and to terminal 20. A parallel circuit is established at the same time through contact switch 142 from terminal 26, contact switch 108, through solenoid 338 to terminal 20. The latter circuit pulls armature 260 to the right, interrupting the change-making circuit through contact 266—268 and the circuit through time-delay solenoid 118. The former circuit through zeroing relay solenoid 336 actuates armature 340 to close contact switches 342 and 344, and to open contact switch 256. It is to be noted that there is still credit in the machine, and to prevent a user from pressing the change button 252 to get a duplication of change before the device is zeroed the contact switch 256 is made to open upon the energization of the zeroing relay solenoid 336.

The momentary impulse through the relay solenoid 336 by means of contact switch 142 of the time-delay mechanism causing the relay solenoid 336 to be self-locked until the last cent of credit is taken off the machine. The self-locking circiut is through relay solenoid 336 from terminal 20, contact switch 344, now closed by the energized solenoid 336, contact switch 193 of the credit-sufficiency determining cam disc 195, contact switch 24 and to terminal 26.

While the relay solenoid 336 remains in a self-locked energization the time-delay mechanism immediately reestablishes the contact switch 140 after the momentary interruption. The toggle switch contacts 270—272 have just been interrupted by the throwing of switch 262 by solenoid 338, and the time delay solenoid 118 can not, therefore, be energized again in the present cycle. A new circuit is established through contact switch 140 from terminal 26, contact switch 342, drum-zeroing solenoid 346, and to terminal 20. The armature 348 is caused to move downwardly by the energized solenoid 346, pulling arm 349, against which it is positioned, with it. This downward motion of arm 348 rotates gear segment 68 about pivot 70 in a clockwise direction against the tension of spring 72. Shaft 64, drum 65 and ratchet wheel 62 are rotated in a counter-clockwise direction through the action of gear segment 68 on pinion gear 66 which is fixed to shaft 64. The pawl merely rides on the teeth of the ratchet wheel 62 while the wheel is rotated in a counter-clockwise direction. When the lug 76 strikes the stop 75 the drum is in the zero credit position shown in the diagram. In this position all the spring contact switches in the coin stripping circuits are open and consequently there is no credit in the machine. The entire machine is now back to its original condition ready to receive the next coin.

If a previous user has neglected to take his change there will still be credit in the machine and if the next user inserts a coin in the slot, the zeroizing device effects an automatic return of the drum 65 to its zero position before the new coin establishes credit. The coin energizes solenoid 18, as stated before, upon closing the contact switch 16. The armature 28 is urged to the right and its insulated head 352 closes the spring contact 350. A circuit is immediately set up through zeroizing relay solenoid 336 from terminal 20, contact switch 350, contact switch 193, contact switch 24 and to terminal 26. The energization of the zeroizing relay solenoid 336 results in the same sequence of events as previously described finishing with the energization of drum-zeroing solenoid 346 and the wiping out of the credit existing in the machine. Since contact switch 193 is closed only when there is credit in the machine this preliminary zeroizing takes place only under the same circumstances.

Another function of the solenoid 18 is to operate the feeling finger arms 542 upon the insertion of each coin into the machine to determine whether or not there are sufficient coins in all the coin tubes for the next user. If any one of the tubes thus becomes depleted of coins the action of the finger arms will lock the mechanism to which rod 28 is attached after a partial return movement upon deenergization of solenoid 18. The coin slot closer 30 will remain in operative position even after solenoid 18 is deenergized. The slight movement of the armature 28 to the left, however, is sufficient to allow spring contact 350 to open even though the armature does not move to the completely inoperative position shown in the diagram. The prospective user will not be able to insert his coin into the machine and he will be notified of the condition of of the machine by the words "Not in service" printed on the vane 13 as shown in Fig. 5 and visible to the user whenever the armature 28 remains in its locked position. The mechanical details of the feeling members 354 and associated parts are portrayed in Figs. 2, 3, 4 and 5 and are explained in detail under the foregoing discussion of the change making mechanism.

Another emergency device on each of the stamp-vending units is the feeling finger 356 which rotates about pivot 358 and bears upon the surface of the stamps in the stamp vending unit 246 as described in copending application Serial No. 275,238. The opposite extension of the finger 356 bears on spring contact switch 191 which is biased to a closed position and will open the contact if the last stamp has been ejected. No more credit will be taken off the machine as long as the user continues to dial that particular denomination of stamp (one-cent stamp in the diagram). The user may, however, either take his change by pressing change button 252, or he may take the equivalent value in another stamp denomination.

To prevent the stamps from becoming sticky, or stuck together, in a moist climate, the heating element 360 may be included between the terminals 26 and 20. The element 360 should be of such a resistance to sufficiently warm the air about the stamps but not draw an unnecessary amount of current. The heating element 360 may be kept in a state of continuous energization while the machine itself is plugged into a circuit, or may have an optional switch, not shown, to warm the stamps only at certain times.

It will be understood that the inserted coin closes switch 16 and energizes solenoid 18. Solenoid 18 closes the coin slot, anl by closing switch 350 resets the credit mechanism to zero through relay 336 if there is credit on the machine to close switch 193. Relay 336 energizes solenoid 346 to zeroize the credit mechanism. The solenoid 18 also operates the coin feeler members, and if one of these locks due to an insufficiency of coins the coin slot is maintained closed, but switch 350 is opened.

After traversing the coin separator, the coin closes one of the main switches 52, 84, or 94. The switch closed energizes the credit mechanism master pawl solenoid 56, and if necessary, one of the stop actuating solenoids 86 or 96 to adjust the credit mechanism to a setting proportional to the value of the coin. Credit solenoid 56 opens switch 24 to deenergize solenoid 18. Solenoid 56 also closes switch 102 energizing the credit relay solenoid 104. Contact switch 102 through switch 112 actuates the time controlled mechanism solenoid 118. On movement of armature 120 the time controlled mechanism closes switch 134 and locks the credit relay solenoid in the circuit until the time controlled mechanism returns to rest. On the return to rest of the time controlled mechanism switch 142 is momentarily closed to actuate solenoid 148 and release the coin from the main switch.

When the main switch is opened solenoid 56 is deenergized and switch 102 is opened to break the circuit to credit relay 102. Relay 104 opens switch 112 and deenergizes solenoid 118.

Selector pointer 160 sets three circuits: from the impulse relay to the dispensing solenoids, from the impulse switch to the credit sufficiency determining switches and the article sufficiency determining switches, and from the impulse switch to the credit subtracting stop solenoids. Upon operation of dial 609 switch 180 energizes the impulse relay solenoid 186 a number of times equal to the number of articles desired. Switch 172 is closed on movement of dial 609 to set a circuit to subtracting stop solenoid 210 or 222 if necessary. Subject to the presence of sufficient credit as determined by contact switches 193, 206, or 208 and to the presence of articles in the dispensing unit as determined by contact switches 187, 189, or 191; the impulse relay solenoid is energized by switch 180.

Impulse relay solenoid 186 locks up by contact switch 194 while 180 is closed and therefore overrides the possible opening of the credit sufficiency determining switch during the delivery of one article, provided the switch was closed by sufficient credit at the beginning of the actuation. By contact switch 192 the impulse relay solenoid actuates subtracting solenoid 232, and by switch 190 actuates the article dispensing solenoid.

To obtain change, change button 252 closes the change switch provided that credit sufficiency determining switch 193 is closed, that dial 609 is at rest and switch 158 is closed, and that the time controlled mechanism is at rest and switch 144 is closed.

Closing of contacts 266 and 268 immediately energizes the coin stripper solenoids set by the credit mechanism. The closing of contacts 270 and 272 energizes the time controlled mechanism solenoid 118 through switch 140. On return to rest the time controlled mechanism closes switch 142 and opens switch 140.

Switch 142 energizes the zeroizing relay solenoid 336 and resets the change switch by solenoid 338. Zeroizing relay solenoid 336 opens the circuit to the change button by switch 256 and locks itself up by switch 344 through switch 193.

As switch 140 closes after being momentarily opened, through switch 342 it energizes the credit mechanism zeroizing solenoid 346. When the credit mechanism is reset to zero, switch 193 opens and deenergizes the credit relay solenoid 336.

Figure 4:
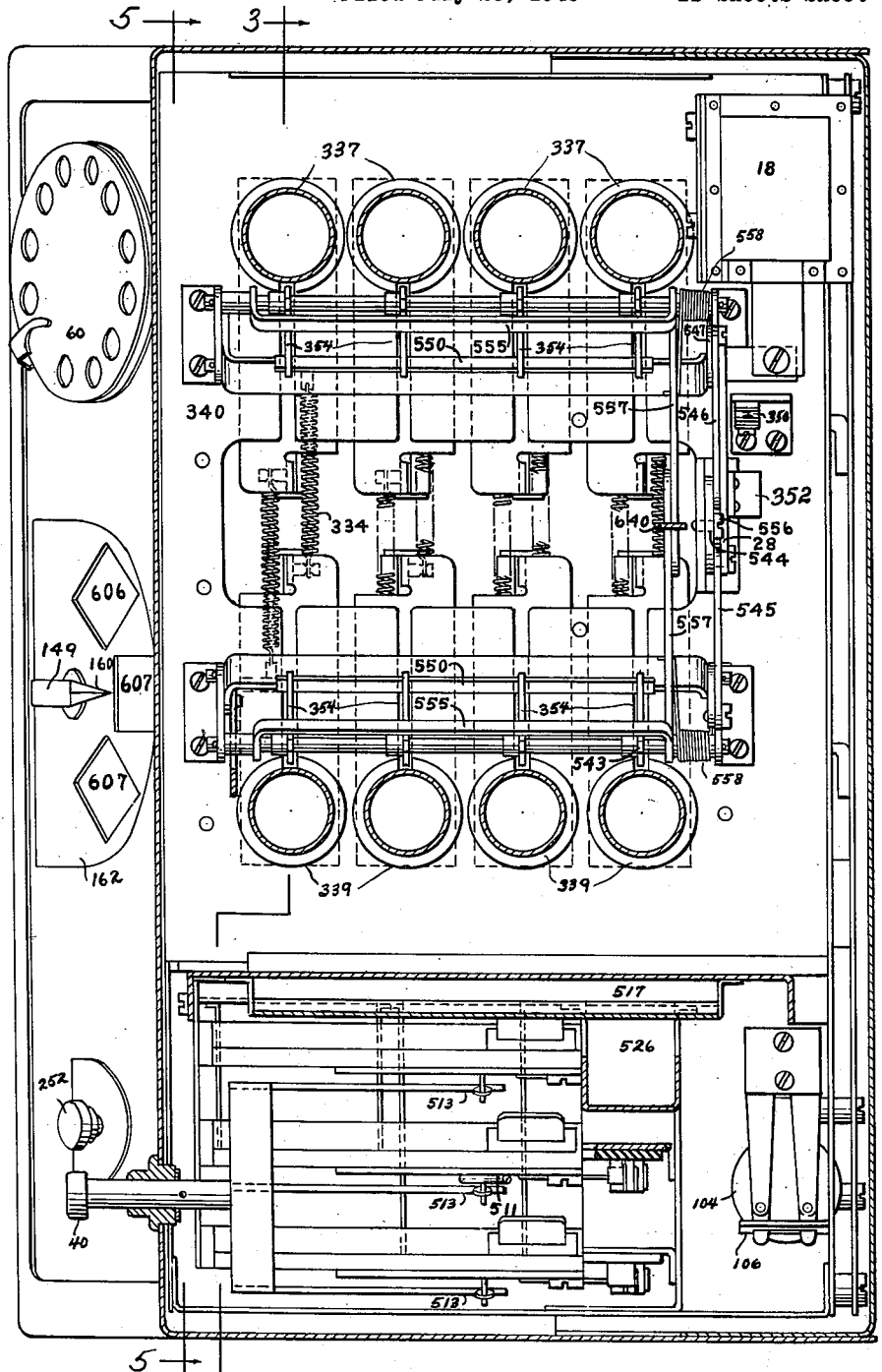
Fig. 4 is a horizontal sectional view of my machine taken on the line 4—4 of Fig. 3.
Figure 6:
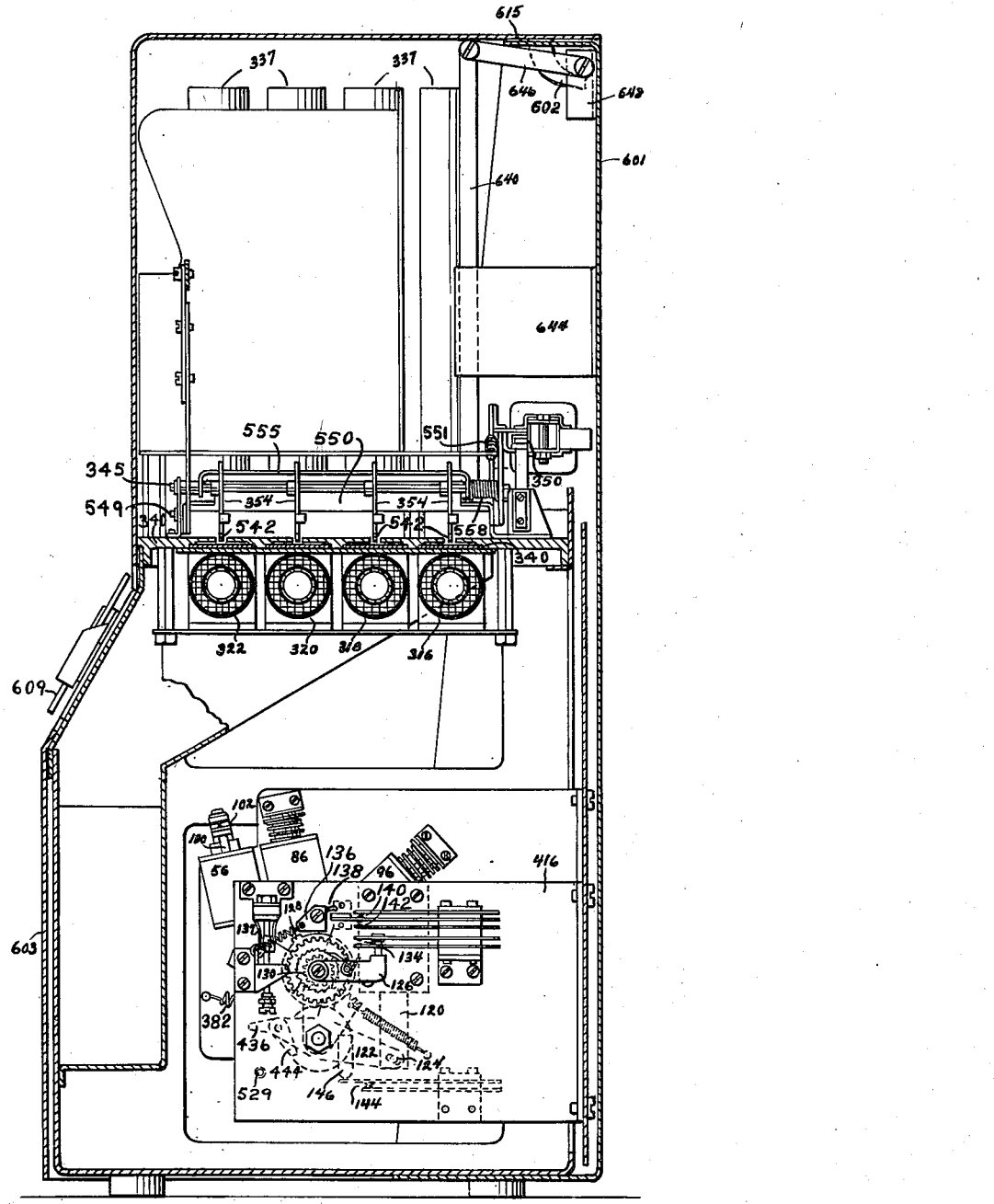
Fig. 6 is a sectional view on the line 6—6 of Fig. 5.

An additional safety feature is the rod 640 as shown in Figure 6. This rod is slidable in bracket 644 appearing in Figures 6 and 3 and rests on the cross arms 557 pivoted to cross bars 345 and spring biased upwardly by springs 558 as shown in Figure 4. The rod 640 is pivoted to a supporting arm 646 which in turn is pivoted to the bracket 648 on the frame 601 as shown in Figure 6. The rod 640 butts against the cover plate 603 whenever it is in place, thus keeping cross arms down in inoperative position as shown in Figure 2. However, when the cover 603 is removed, as for replenishing the coin tubes, cross arms 557 will rise and withdraw all feeler arms 542 from the tubes, thus insuring that the coins introduced into the tubes will not jam on top of any feeler arms which would enter the coin tubes.

I claim as my invention:

1. In a coin controlled vending machine, coin receiving mechanism, credit mechanism settable in accordance with the value of a coin received and resettable on dispensing operations in accordance with the value of articles dispensed, means for actuating the credit mechanism to adjust the credit setting, coin operated means in the coin receiving mechanism adapted to engage and receive a coin deposited in the coin receiving mechanism and controlling operation of the means for actuating the credit mechanism, and cyclic delaying means started running in response to the engagement of the coin operated means with a coin operative after a time interval to remove the coin from engagement with the coin operated mechanism.

2. In a coin controlled vending machine, coin receiving mechanism, credit mechanism settable in accordance with the value of a coin received and resettable on dispensing operations in accordance with the value of articles dispensed, electromagnetically controlled means for actuating the credit mechanism to adjust the credit setting, coin actuated switch means in the coin receiving mechanism adapted to engage and receive a coin deposited in the coin receiving mechanism for operating the electromagnetically controlled means to actuate the credit mechanism, and cyclic delaying means started running in response to a coin deposited in the coin receiving mechanism operative after a time interval to terminate the engagement of the coin with said switch means.

3. In a coin controlled vending machine, coin receiving mechanism, credit mechanism settable in accordance with the value of a coin received and resettable on dispensing operations in accordance with the value of articles dispensed, electromagnetically controlled means for actuating the credit mechanism to adjust the credit setting, coin actuated switch means in the coin receiving mechanism adapted to engage and receive a coin deposited in the coin receiving mechanism for operating the electromagnetically controlled means to actuate the credit mechanism, and cyclic delaying means started running in response to energization of the electromagnetically operated means operative after a running period to terminate the engagement of the coin with said switch means.

4. In a coin controlled vending machine, coin receiving mechanism, credit mechanism settable in accordance with the value of a coin received and resettable on dispensing operations in accordance with the value of articles dispensed, electromagnetically controlled actuating means to adjust the credit mechanism to a credit setting, coin responsive switch means operated by a coin deposited in the coin receiving mechanism for operating the electromagnetically controlled actuating means, cyclic delaying switch means started running in response to operation of said actuating means operative to maintain the operation of said means during a time interval sufficient for correct setting of the credit mechanism, and operative thereafter to maintain the credit mechanism in its adjusted position.

5. In a coin controlled vending machine, coin receiving mechanism, credit mechanism settable in accordance with the value of a coin received and resettable on dispensing operations in accordance with the value of articles dispensed, electromagnetically controlled actuating means to adjust the credit mechanism to a credit setting, coin responsive switch means operated by a coin deposited in the coin receiving mechanism for operating the electromagnetically controlled actuating means, cyclic delaying switch means started running in dependency on operation of said electromagnetically controlled actuating means operative to maintain the operation of said means during a time interval sufficient for correct setting of the credit mechanism and operative thereafter to maintain the credit mechanism in its adjusted position.

6. In a coin controlled vending machine, coin receiving mechanism, credit mechanism settable in accordance with the value of a coin received and resettable on dispensing operations in accordance with the value of articles dispensed, electromagnetically controlled actuating means for adjusting the credit mechanism to a credit setting depending on the denomination of a coin deposited in the credit mechanism, coin responsive switch means adapted to receive and engage and be operated by a coin deposited in the coin receiving mechanism for operating said electromagnetically controlled actuating means, and cyclic delaying means started running in dependency on operation of said actuating means operative after a time interval to terminate the engagement of the coin with the coin responsive switch means.

7. In a coin controlled vending machine, coin receiving mechanism, credit mechanism settable in accordance with the value of a coin received and resettable on dispensing operations in accordance with the value of articles dispensed, electromagnetically controlled actuating means for adjusting the credit mechanism to a credit setting depending on the denomination of a coin deposited in the credit mechanism, coin responsive switch means adapted to receive and engage and be operated by a coin deposited in the coin receiving mechanism for operating said electromagnetically operated actuating means, and cyclic delaying means started running in dependency on operation of said actuating means operative to maintain operation of the actuating means during a time interval sufficient for correct setting of the credit mechanism and operative thereafter to hold the credit mechanism in its adjusted position and to terminate the engagement of the coin with the coin responsive switch means.

8. In a coin controlled vending machine, credit mechanism settable in accordance with the value of a coin received and resettable on dispensing operations in accordance with the value of articles dispensed comprising a rotatable shaft, coin responsive means for rotating said shaft to a credit setting, coin dispensing mechanism for delivering change, electrical operating means for actuating the coin dispensing mechanism to deliver change, first control switch means for energizing the operating means, further control switch means for said operating means mounted in spaced relation to said shaft, cam disc means mounted on said shaft engageable with said further control switch means to operate the further control switch means to cause the electrical operating means under operation of said first control switch means to deliver change in accordance with the credit setting of the credit mechanism.

9. In a coin controlled vending machine, credit mechanism settable in accordance with the value of a coin received and resettable on dispensing operations in accordance with the value of articles dispensed, and actuating means for setting the credit mechanism comprising electromagnetically controlled means for moving the credit mechanism to adjust the credit setting, electromagnetically operated means for limiting the extent of movement of the credit mechanism, coin receiving mechanism, and means responsive to a coin deposited in the coin receiving mechanism selectively operative in accordance with its denomination to actuate the magnetically operated means to limit the extent of movement of the credit mechanism in accordance with the denomination of the coin.

10. In a coin controlled vending machine, credit mechanism settable in accordance with the value of a coin received and resettable on dispensing operations in accordance with the value of articles dispensed, and actuating means for setting the credit mechanism comprising solenoid means for moving the credit mechanism to adjust the credit setting, solenoid actuated stop means for limiting the extent of movement of the credit means, coin receiving mechanism, and switch means responsive to the coin deposited in the coin receiving mechanism selectively operative in accordance with its denomination to actuate the solenoid actuated stop means to limit the extent of movement of the credit means in accordance with the denomination of the coin.

11. In a coin controlling vending machine, article dispensing mechanism, credit mechanism settable in accordance with the value of a coin received and resettable on dispensing operations in accordance with the value of articles dispensed, coin responsive means for setting the credit mechanism to a credit setting depending on the value of the coin, electromagnetically actuated means for moving the credit mechanism to lower credit settings and selectively operative control stop means engageable with said electromagnetically actuated means to stop movement of the credit mechanism at lower credit settings, and means controlling operation of the article dispensing mechanism operated by the credit mechanism for limiting the dispensing of articles in accordance with their value.

12. In a coin controlled vending machine, credit mechanism settable in accordance with the value of a coin received and resettable on dispensing operations in accordance with the value of articles dispensed, actuating means for setting the credit mechanism to a credit setting proportional to the value of the coin, electromagnetically actuated means for moving the credit mechanism to lower credit settings, stop means for limiting the movement of the credit mechanism by the electromagnetically actuated means, article dispensing means, and control means for said stop means operating selectively in dependency on operation of the article dispensing means to stop movement of the credit mechanism at lower credit settings.

13. In a coin controlled vending machine, credit mechanism settable in accordance with the value of a coin received and resettable on dispensing operations in accordance with the value of articles dispensed, spring means for moving the credit mechanism to different credit settings, pawl means engageable with the credit mechanism to maintain the same against movement by the spring means, main solenoid operated means for retracting said pawl means to allow movement of the credit mechanism by the spring means, stop means on the credit mechanism, solenoid operated stop means selectively engageable with the stop means on the credit mechanism operative to provide limited movements of the credit mechanism by the spring means, solenoid operated means for reversely moving the credit mechanism against the spring means, and control means for said means for reversely moving the credit mechanism operative to limit the reverse movement of the credit mechanism.

14. In a coin controlled vending machine, credit mechanism settable in accordance with the value of a coin received and resettable on dispensing operations in accordance with the value of articles dispensed, spring means for moving the credit mechanism to different credit settings, pawl means engageable with the credit mechanism to maintain the same against movement by the spring means, main solenoid operated means for retracting said pawl means to allow movement of the credit mechanism by the spring means, stop means on the credit mechanism, solenoid operated stop means selectively engageable with the stop means on the credit mechanism operative to provide limited movements of the credit mechanism by the spring means, solenoid operated means for reversely moving the credit mechanism against the spring means, and solenoid operated stop means operative to limit the reverse movement of the credit mechanism.

15. In a coin controlled vending machine, article dispensing mechanism, credit mechanism settable in accordance with the value of a coin received and resettable on dispensing operations in accordance with the value of articles dispensed, actuating means for moving the credit mechanism in one direction to adjust the credit setting, electromagnetically operated actuating means for reversely moving the credit mechanism, electromagnetically operated stop means engageable with said electromagnetically operated actuating means to limit the reverse movement of the credit mechanism, and means controlling operation of the article dispensing mechanism operated by the credit mechanism for limiting the dispensing of articles in accordance with their value.

16. In a coin controlled vending machine, credit mechanism settable in accordance with the value of a coin received and resettable on dispensing operations in accordance with the value of articles dispensed, coin receiving mechanism, coin responsive actuating mechanism responsive to a coin deposited in the coin receiving mechanism operative to move the credit mechanism to a credit setting depending on the denomination of the coin, actuating means operative to reversely move the credit mechanism a limited distance to lower the credit setting, and further actuating means operative to reversely move the credit mechanism to zero credit setting.

17. In a coin controlled vending machine, article delivery means, control means for operating the article delivery means, credit mechanism settable in accordance with the value of a coin received and resettable in accordance with the value of articles dispensed, means actuated by the credit mechanism operative to prevent operation of the article delivery means in dependency on the credit setting, and means operated by said control means to prevent operation of said last mentioned means.

18. In a coin controlled vending machine, article delivery means, control means for operating the article delivery means, credit mechanism settable in accordance with the value of a coin received and resettable in accordance with the value of articles dispensed, means for resetting the credit mechanism to a lower value responsive to delivery operation of the article delivery means, means actuated by the credit mechanism operative to prevent delivery operation of the article delivery means in dependency on the credit setting, and means operated by said control means to prevent operation of said last mentioned means during delivery operation of the article delivery means.

19. In a coin controlled vending machine, article delivery mechanism, credit mechanism settable in accordance with the value of a coin received and resettable on dispensing operations in accordance with the value of articles dispensed, electromagnetic means for operating the article dispensing mechanism, a relay, a switch controlled by said relay to energize said electromagnetic means, a control switch for energizing said relay, a switch in series with said control switch adapted to be opened by operation of said credit mechanism to prevent energization of said relay, and a second switch operated by said relay in parallel with said last mentioned switch operative to maintain said relay energized after said last mentioned switch has been opened by operation of said credit mechanism.

20. In a coin controlled vending machine, credit mechanism settable in accordance with the value of a coin received and resettable on dispensing operations in accordance with the value of articles dispensed, article dispensing mechanism, coin receiving mechanism, means responsive to a coin deposited in the coin receiving mechanism operative to adjust the credit mechanism to a setting depending on the denomination of the coin, main control means for causing the dispensing mechanism to operate, and further control means responsive to operation of said adjusting means operative during its operation in adjusting the credit mechanism to prevent operation of the dispensing means by said main control means.

21. In a coin controlled vending machine, credit mechanism settable in accordance with the value of a coin received and resettable on dispensing operations in accordance with the value of articles dispensed, article dispensing mechanism, coin receiving mechanism, means responsive to a coin deposited in the coin receiving mechanism operative to adjust the credit mechanism to a setting depending on the denomination of the coin, electromagnetic actuating means for the article dispensing means, main control switch means operative to energize said electromagnetic actuating means, and second control switch means operating in dependency on operation of said adjusting means operative to prevent energization of said electromagnetic actuating means during operation of the adjusting means.

22. In a coin controlled vending machine, coin receiving mechanism, credit mechanism settable in accordance with the value of a coin received and resettable on dispensing operations in accordance with the value of articles dispensed, coin dispensing mechanism for delivering change, actuating means responsive to a coin deposited in the coin receiving mechanism to adjust the credit mechanism to a credit setting depending on the denomination of the coin, means controlled by the credit mechanism operative to set the coin dispensing mechanism to deliver change in value equal to the credit setting of the credit mechanism, control means for causing operation of the coin dispensing means under control of the credit mechanism, and further coin dispensing mechanism control means operative during operation of said actuating means to prevent operation of said control means.

23. In a coin controlled vending machine, coin receiving mechanism settable in accordance with the value of a coin received and resettable on dispensing operations in accordance with the value of articles dispensed, credit mechanism, electromagnetically operated coin dispensing mechanism for delivering change, actuating means responsive to a coin deposited in the coin receiving mechanism to adjust the credit mechanism to a credit setting depending on the denomination of the coin, first coin dispensing mechanism control switch means controlled by the credit mechanism operative to set the change making mechanism to deliver change in value equal to the credit setting of the credit mechanism, second coin dispensing mechanism control switch means operative to energize the electromagnetically operated coin dispensing mechanism through said first control switch means to deliver change from the coin dispensing mechanism, and further control switch means operative during operation of said actuating means to prevent energization of said electromagnetically operated coin dispensing mechanism.

24. In a change making vending machine, coin dispensing mechanism for delivering change, article dispensing mechanism, manually displaceable first control means for operating the article dispensing mechanism, further control means for actuating the coin dispensing mechanism to deliver change, and means responsive to displacement of said first control means to prevent operation of said further control means.

25. In a change making vending machine, coin dispensing mechanism for delivering change, article dispensing mechanism, electromagnetic means for operating the coin dispensing mechanism, control switch means for energizing the electromagnetic means, manually displaceable control means for operating the article dispensing mechanism, further control switch means responsive to displacement of said manually displaceable control means to prevent energization of said electromagnetic means.

26. In a coin controlled vending machine, coin receiving mechanism, coin dispensing mechanism for delivering change, control means operative to actuate the coin dispensing mechanism to deliver change, coin responsive means adapted to engage and receive a coin deposited in the coin receiving mechanism, means operative to move the coin from engagement with said coin responsive means, and means operative during engagement of the coin with the coin responsive means to prevent actuation of the coin dispensing means by the control means and operative thereafter to permit actuation of the coin dispensing means by the control means.

27. In a coin controlled vending machine, coin dispensing mechanism for delivering change, control means for actuating the coin dispensing mechanism to deliver change, and cyclic delaying means started running in response to operation of the control means operative after a time interval to reset the coin dispensing mechanism for further change delivery.

28. In a coin controlled vending machine, coin dispensing mechanism for delivering change, control means for actuating the coin dispensing mechanism to deliver change, cyclic delaying means started running in response to operation of the control means operative after a time interval to reset the coin dispensing mechanism for further change delivery, and to cause the control means to become inoperative to prevent repeated change delivery by the coin dispensing mechanism.

29. In a change making vending machine, coin dispensing means, electromagnetically operated means for actuating the coin dispensing means, main switch means adjustable to closed position to energize the electromagnetically operated means, and adjustable to open position to deenergize said electromagnetically operated means, solenoid actuated means for adjusting said main switch means to closed position, manual coin dispensing control switch means operative to energize said solenoid means to adjust the main switch means to closed position, and means automatically operative in dependency on operation of the manual control switch means to readjust the main switch to open position.

30. In a change making vending machine, coin dispensing means, electromagnetically operated means for actuating the coin dispensing means, main switch means adjustable to closed position to energize the electromagnetically operated means, and adjustable to open position to deenergize said electromagnetically operated means, solenoid actuated means for adjusting said main switch means to closed position, manual coin dispensing control switch means operative to energize said solenoid means to adjust the main switch means to closed position, means automatically operative in dependency on operation of the manual control switch means to readjust the main switch to open position, and to prevent a subsequent energization of the solenoid actuating means by the manual control switch means.

31. In a change making vending machine, coin dispensing means, electromagnetically operated means for actuating the coin dispensing means, main switch means adjustable to closed position to energize the electromagnetically operated means, and adjustable to open position to deenergize said electromagnetically operated means, first solenoid actuating means for adjusting said main switch means to closed position, manual coin dispensing control switch means operative to energize said first solenoid means to adjust the main switch means to closed position, second solenoid actuating means for adjusting said main switch means to open position, and cyclic delaying means started running in response to operation of said manual switch means operative after a time period to energize said second solenoid actuating means to adjust the main switch means to open position for deenergizing said electromagnetically operated means.

32. In a coin controlled vending machine, credit mechanism settable in accordance with the value of a coin received and resettable on dispensing operations in accordance with the value of articles dispensed, coin dispensing mechanism for delivering change, means controlled by the credit mechanism selectively operative to set the coin dispensing mechanism to deliver change in value equal to any credit setting of the credit mechanism, coin dispensing mechanism control means operative to actuate the coin dispensing mechanism to deliver change in value equal to the then existing credit setting of the credit mechanism, and cyclic delaying means started running in response to operation of the coin dispensing control means operative after a running period to reset the credit mechanism to zero credit setting.

33. In a coin controlled vending machine, credit mechanism settable in accordance with the value of a coin received and resettable on dispensing operations in accordance with the value of articles dispensed, coin dispensing mechanism for delivering change, means controlled by the credit mechanism selectively operative to set the coin dispensing mechanism to deliver change in value equal to any credit setting of the credit mechanism, coin dispensing control means operative to actuate the coin dispensing mechanism to deliver change in value equal to the then existing credit setting of the credit mechanism, cyclic delaying means started running in response to operation of the coin dispensing control means operative after a running period to reset the credit mechanism to zero credit setting, and to restore the coin dispensing mechanism to its condition prior to change delivery for further operation under a subsequent setting by the credit mechanism.

34. In a vending machine, article dispensing mechanism, credit mechanism settable in accordance with the value of a coin received and resettable on dispensing operations in accordance with the value of articles dispensed, coin actuated means for setting up credit in the credit mechanism, means adapted to reduce the credit setting of the credit mechanism step by step, electrically controlled stop means controlling and limiting each operation of the credit reducing means, and means controlling operation of the article dispensing mechanism operated by the credit mechanism for limiting the dispensing of articles in accordance with their value.

35. In a vending machine, credit mechanism settable in accordance with the value of a coin received and resettable on dispensing operations in accordance with the value of articles dispensed, coin responsive electrically controlled actuating means selectively operative to set the credit mechanism to a credit setting depending on the value of coins of different denominations, coin dispensing mechanism for delivering change, electrical means for actuating the coin dispensing mechanism to deliver change in varying quantity, electrical control means for operating the coin dispensing actuating means in the coin dispensing mechanism to deliver change to the amount of the credit setting in the credit mechanism, article dispensing mechanism, electrical actuating means for delivering articles therefrom, manually settable control means for causing the article actuating means to deliver articles in varying quantity according to the setting of the control means, electrical control means for moving credit setting of the credit mechanism to a lower credit setting each time an article is delivered by the article dispensing mechanism by an amount representing the value of the article delivered, electrical control means for preventing delivery of the articles by the article dispensing means in excess of the credit setting in the credit mechanism at any time, and means becoming operable upon the completion of delivery of articles by the article dispensing means for operating the coin dispensing mechanism actuating means to deliver change from the coin dispensing mechanism to a value in accordance with the setting of the credit mechanism.

36. In a vending machine, coin responsive electrically controlled credit mechanism adapted to be moved to a credit setting depending on the value of the coin, electrically operated article dispensing means adapted to deliver articles in varying quantity successively, a manually settable electrical control for the article dispensing means for effecting delivery of articles in the quantity desired, electrical control means for moving the credit mechanism to lower credit setting in accordance with the value of each successive article delivered by the article dispensing means, electrical control means for preventing delivery by the article dispensing means of articles of a value in excess of the credit setting at any time of the credit mechanism, coin dispensing mechanism for delivering change, and electrically operated means for causing the coin dispensing mechanism to deliver change to an amount in accordance with credit setting of the credit mechanism become operable upon the discontinuance of delivery operation by the article dispensing mechanism.

37. In a vending machine, coin responsive electrically controlled credit mechanism movable to a credit setting depending on the value of the coin, electrically operated article dispensing means adapted to deliver articles of different value and in varying quantity, and deliver articles successively, electrical circuit means controlling operation of the article dispensing means including a manually settable member for setting the article dispensing mechanism to deliver articles of a selected kind and value, a further manually settable member for setting the article dispensing mechanism to deliver articles to a selected number, and further including control means for moving the credit mechanism to a lower credit setting in accordance with the value of each article delivered by the article dispensing mechanism and preventing delivery by the article dispensing mechanism of articles of a value beyond that corresponding to the credit setting of the credit mechanism, and electrically operated coin dispensing mechanism for delivering change controlled by the credit mechanism, and operable upon the completion of delivery of articles by the article dispensing means to deliver change to the value of the then existing credit setting in the credit mechanism.

38. In a vending machine as in claim 37, a manually operated electric control for causing operation of the coin dispensing mechanism.

39. A coin controlled vending machine comprising coin receiving mechanism adapted to receive coins of various denominations, credit mechanism settable in accordance with the value of a coin received and resettable on dispensing operations in accordance with the value of articles dispensed, article dispensing mechanism adapted to deliver articles of different kind and in different quantities, coin dispensing mechanism for delivering change, electrical means responsive to the coin deposited in the coin receiving mechanism selectively operative in accordance with its denomination to set the credit mechanism to a credit setting proportional to the denomination of the coin, electrical means for the coin dispensing mechanism selectively operated by the credit mechanism to set the coin dispensing mechanism to deliver change in an amount corresponding to the credit setting at any time in the credit mechanism, electrical control means responsive to the credit mechanism permitting the delivery by the article dispensing mechanism of articles to a value not in excess of that corresponding to the credit setting in the credit mechanism and operative to prevent the delivery by the article dispensing mechanism of articles to a value in excess of that corresponding to the credit setting in the credit mechanism, electrically actuated feed means in the article dispensing mechanism for each different kind of article and operative to deliver articles in varying quantity successively, means for resetting the credit mechanism to lower credit settings by the value of each article delivered by the article dispensing mechanism, manually settable electrical control means for setting the article feed means in the article dispensing mechanism to deliver articles of the kind and in the number desired, credit deduction electrical control means for the reset means in the credit mechanism for effecting reduction of the credit setting by the value of each article delivered by the article dispensing mechanism, and coin dispensing control means operable after completion of delivery of articles by the article dispensing mechanism to cause operation of the coin dispensing mechanism, according to the change setting thereof by the credit mechanism, to deliver change in value corresponding to the then existing credit setting in the credit mechanism.

40. A vending machine as in claim 39 further including means responsive to the article selector control of the article feed means for preventing operation coin dispensing control of the coin dispensing mechanism by the coin dispensing control mechanism during delivery of articles by the article dispensing mechanism.

GEORGE R. SUTHERLAND.